US006223284B1

(12) United States Patent
Novoa et al.

(10) Patent No.: US 6,223,284 B1
(45) Date of Patent: Apr. 24, 2001

(54) METHOD AND APPARATUS FOR REMOTE ROM FLASHING AND SECURITY MANAGEMENT FOR A COMPUTER SYSTEM

(75) Inventors: Manuel Novoa, Houston; Paul H. McCann; Wayne P. Sharum, both of Tomball; Adrian Crisan, Cypress; Paul B. Hokanson, Bastrop, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/070,942

(22) Filed: Apr. 30, 1998

(51) Int. Cl.[7] .................................................... G06F 13/00
(52) U.S. Cl. .......................... 713/100; 709/216; 709/246; 709/311; 709/327; 713/1; 713/2
(58) Field of Search ..................................... 713/202, 200; 711/103; 709/217, 218, 220, 221; 365/185.33

(56) References Cited

U.S. PATENT DOCUMENTS

| 5,339,437 | 8/1994 | Yuen ..................................... 395/700 |
| 5,421,009 | * 5/1995 | Platt ..................................... 395/600 |
| 5,579,522 | * 11/1996 | Christeson et al. ...................... 713/2 |
| 5,724,027 | 3/1998 | Shipman et al. ................ 340/825.31 |
| 5,761,071 | * 6/1998 | Bernstein et al. .............. 364/479.07 |
| 5,794,033 | * 8/1998 | Adlebert ................................ 713/100 |
| 5,812,857 | * 9/1998 | Nelson et al. ........................ 395/712 |
| 5,826,015 | * 10/1998 | Schmidt ................................ 713/201 |
| 5,917,912 | * 6/1999 | Ginter et al. ............................ 380/24 |
| 5,935,249 | * 8/1999 | Stern et al. ........................... 713/201 |

(List continued on next page.)

OTHER PUBLICATIONS

Compaq Computer Corporation, White Paper, "Remote System ROM Upgrade on Compaq ProLiant Servers," © 1994 Compaq Computer Corporation, First Edition, Feb. 1995, pp. 1–6.

Microsoft corporation, "DeviceIoControl QuickInfo," Win32 SDK–Win32 References Functions, © 1992–1996 Microsoft corporation, pp. 1–3.

Johns, Paul, "Signing and marking ActiveX Controls," © 1997 Microsoft Corporation, Oct. 15, 1996, pp. 1–11.

(List continued on next page.)

Primary Examiner—Reba I. Elmore
(74) Attorney, Agent, or Firm—Akin, Gump, Strauss, Hauer & Feld, L.L.P.

(57) ABSTRACT

A remote flash ROM and security package is formed and delivered to a system ROM of a target computer system for remote flashing of the ROM and remote configuration of security settings for the computer system. The remote flash ROM and security package includes flash ROM and security control code for calling a remote flash and security driver to execute a remote flash or to remotely configure a security setting, a file containing a "signed" ROM image to be flashed to the ROM, a security settings file which preferably is encrypted, and a remote flash and security control container for containing the flash ROM and security code, the ROM image, and the security settings file. The remote flash and security driver may be included in the remote flash ROM and security package or may be resident to the target computer system. In the preferred embodiment, the computer system includes a secure memory device containing an administrator password for locking and unlocking the ROM. The remote flash ROM and security package preferably includes an administrator password matching the administrator password stored in the secure memory device to place the computer system in an administrator mode. A system ROM thereby may be flashed or a security setting changed remotely without the need for a user to enter an administrator password. Further, flashing the ROM or changing a security setting occurs as an "inband" process. Flashing a ROM or changing a security setting by remotely providing an administrator password to a secure memory device eliminates the need to reboot a computer system after downloading the ROM and security package.

63 Claims, 20 Drawing Sheets

U.S. PATENT DOCUMENTS

| | | | |
|---|---|---|---|
| 5,940,627 | * 8/1999 | Luciani et al. | 710/14 |
| 5,964,873 | * 10/1999 | Choi | 713/2 |
| 5,974,549 | * 10/1999 | Golan | 713/200 |
| 5,991,879 | * 11/1999 | Still | 713/200 |
| 6,009,524 | * 12/1999 | Olarig et al. | 713/200 |
| 6,012,100 | * 1/2000 | Frailong et al. | 709/250 |

OTHER PUBLICATIONS

Microsoft Corporation, "ActiveX Control Containers," © 1997 Microsoft Corporation, pp. 1–10.

Advanced Micro Devices, Inc., "Am291F002T/Am29F002B, 2 Megabit (262, 144×8–Bit) CMOS 5.0 Volt-only, Sector Architecture Flash Memory," © 1996, Dec. 1996, pp. 1–35.

Block, Thomas, Standard BIOS 32–bit Service Directory Proposal, Phoenix Technologies Ltd., PC Division, Desktop Product Line, Jun. 22, 1993, pp. 1–8.

Compaq Computer Corporation, "Compaq Product Information, Bulletin, ProLiant Family of Servers Section 8," © 1994 Compaq Computer Corporation, Feb. 2, 1995, pp. 1–6.

Microsoft Corporation, "WinVerifyTrust," © 1997 Microsoft Corporation, pp. 1–3.

Microsoft Corporation, "ActiveX Topics," © 1997 Microsoft Corporation, pp. 1–2.

Microsoft Corporation, "ActiveX Controls," © 1997 Microsoft Corporation, pp. 1–4.

Microsoft Corporation, "ActiveX Overview," © 1997 Microsoft Corporation, p. 1 of 1.

Microsoft Corporation, "What's Active X? This Time With Feeling," © 1997 Microsoft Corporation, p 1 of 1.

Microsoft Corporation, "Microsoft Authenticode Technology," © 1997 Microsoft Corporation, p. 1 of 1.

Microsoft Corporation, "Microsoft Systems Management Server 1.2," © 1997 Microsoft Corporation, pp. 1–5.

Microsoft Corporation, "Product Overview, Product Highlights, Technical Features, and Specifications," © 1997 Microsoft Corporation, pp. 1–6.

Wiewall, Elizabeth, "Secure Your Applications With the Microsoft CryptoAPI," © 1997 Microsoft Corporation, pp. 1–4.

Microsoft Corporation, "What is the Exploder Control and How Does it Relate to Authenticode?" © 1997 Microsoft Corporation, pp. 1–3.

Microsoft Corporation, "Extending CryptoAPI," © 1997 Microsoft Corporation, pp. 1–2.

Microsoft Corporation, "Encrypting Messages Using the CryptoAPI," © 1997 Microsoft Corporation, pp. 1–2.

Microsoft Corporation, "Decrypting Messages by Using the CryptoAPI," © 1997 Microsoft Corporation, pp. 1–2.

Microsoft Corporation, "Microsoft CryptoAPI," © Microsoft Corporation, pp. 1–5.

Microsoft Corporation, Microsoft Knowledge Base, Sample: Implementing IobjectSafety in an ActiveX Control, © 1997 Microsoft Corporation, Thursday, Feb. 25, 1997, pp. 1–4.

Chappell, David, "Understanding Active X and OLE," Microsoft Press, Copyright © 1996, pp. 203–217.

* cited by examiner

METHOD AND APPARATUS FOR REMOTE ROM FLASHING AND SECURITY MANAGEMENT FOR A COMPUTER SYSTEM

CROSS REFERENCE TO RELATED APPLICATIONS

Commonly-assigned, U.S. patent application Ser. No. 09/070,458, now U.S. Pat. No. 6,145,085 entitled "METHOD AND APPARATUS FOR PROVIDING REMOTE ACCESS TO SECURITY FEATURES ON A COMPUTER NETWORK," filed on Apr. 30, 1998;

Commonly-assigned U.S. Pat. No. 6,073,206, entitled "A METHOD FOR FLASHING ESCD AND VARIABLES INTO A ROM," issued on Jun. 6, 2000;

Commonly-assigned, co-pending U.S. patent application Ser. No. 09/070,942, entitled "COMPUTER METHOD AND APPARATUS FOR REMOTE ROM FLASHING AND SECURITY MANAGEMENT FOR A COMPUTER SYSTEM," filed on Apr. 30, 1998;

Commonly-assigned, co-pending U.S. patent application Ser. No. 09/070,936, entitled "COMPUTER METHOD AND APPARATUS TO PROMPT FOR ADMINISTRATIVE PASSWORD TO FLASH A CORRUPTED NON-VOLATILE MEMORY," filed on Apr. 30, 1998; and Commonly-assigned, co-pending U.S. patent application Ser. No. 09/071,127, entitled "COMPUTER METHOD AND APPARATUS TO FORCE BOOK BLOCK RECOVERY," filed on Apr. 30, 1998.

BACKGROUND OF THE INVENTION

1. Field of the Invention

The present invention relates to non-volatile memory flashing and security management for a computer system, and more particularly, to a method and apparatus for remote non-volatile memory flashing and security management.

2. Description of the Related Art

A remote system management product ideally mhlimizes user action required for system management. Various system management tasks such as delivering software to a target machine or powering a target machine may be remotely performed by a system administrator rather than a user. Certain other system management tasks, however, maintain the need for user action in combination with tasks performed by a system administrator. For these tasks, it has been necessary for a user to be present at a target machine. Two examples of these tasks are flashing a read-only-memory (ROM) of a target machine and changing a security setting for a target machine.

The conventional method of flashing a read-only-memory (ROM) or changing a security setting of a target computer system begins with downloading a new ROM image and flash utility onto a fixed disk of the target computer system. The ROM image and flash utility have typically been gathered from a support compact disc or a website and stored on an operating system partition or a dedicated vendor unique system partition of the fixed disk. Alternatively, the new ROM image and flash utility may be initially stored onto a secondary ROM or non-volatile random access memory (NVRAM) and then copied to the system ROM of the computer system. The system ROM is placed in a protected state by the basic input/output system (BIOS) services during power up of the computer system, thereby preventing a flash operation to the system ROM. After the new ROM image and flash utility are downloaded, the flash utility forces the user to create a flash utility diskette. The user then cold boots the computer system with the created diskette in the floppy drive. When the computer system detects the created diskette, the computer system brings up the program to flash the system ROM. The program to flash the system ROM can prompt the user to enter an administrator password. The program then allows the user to set a configuration parameter or flag to indicate a request to flash the system ROM with the new ROM image. The request to flash the ROM is queued. Upon a reboot of the computer system, the flash utility diskette provides the administrator password to the system ROM to place the system ROM in an unprotected state allowing for a flash operation to the system ROM. Placing the system ROM in an unprotected state upon reboot prevents the BIOS from protecting or locking the ROM. The flash utility diskette next flashes the system ROM. It thus has been necessary for a user to copy a flash utility and ROM image to the system ROM, reboot the computer system, and enter an administrator password as a prerequisite to flashing the ROM. The flash utility which performs the flash of the system ROM also verifies that the system ROM is flashed correctly. The computer system must then be rebooted again to activate the new ROM image flashed to the system ROM.

Similarly, in administering certain security settings of a computer system, it has been necessary to store code and a security settings file on a system partition, request a change to a security setting which is queued for execution upon the next reboot of the computer system, and reboot the computer system to activate the change to the security setting. This process of downloading a flash ROM and security software package and running the code in the package upon reboot of the computer system before flashing a ROM or changing a security setting may be termed an out-of-band process.

Flashing a ROM or changing a security setting as an Aout-of-band≅ process has certain disadvantages. Queuing a change to a security setting and activating the change to the security setting upon reboot poses a risk of intervention between the time the change is queued and the time the computer system is rebooted. For example, if a system administrator requests a disabling of a power-on password of a terminated employee, the power-on password of the terminated employee continues to be in effect after the request by the administrator until a subsequent reboot of the computer system. As a result, in this time window, a terminated employee is able to tamper with the files on the computer system prior to a reboot of the computer system. Another basic disadvantage of an out-of-band process is the risk of system error upon the reboot of the computer system. If a system error occurs upon a reboot of a computer system, the queued request to change a security setting may not be serviced. Therefore, upon reboot of a computer system, a system administrator is unable to determine if the change to a security setting is in effect.

SUMMARY OF THE INVENTION

Briefly, a system according to the present invention provides a remote flash ROM and security package to be delivered to a system ROM of a target computer system for remote flashing of the system ROM or remote configuration of security settings for the computer system. The remote flash ROM and security package includes flash ROM and security control code for calling a remote flash and security driver to selectively execute a remote flash and a remote security setting configuration, a file containing a ROM image to be flashed to the system ROM, a security settings file which preferably is encrypted, and a remote flash and security control container for containing the flash ROM and security control code, the ROM image file, and the security settings file. The remote flash and security driver may be included in the remote flash ROM and security package or may be resident to the target computer system. If the target computer system includes a web browser which may serve as a remote flash and security control container, the remote flash ROM and security package need not include a remote flash and security control container.

In the disclosed embodiment, the computer system includes a secure memory device, or "black box," containing an administrator password for locking and unlocking the flash part of the system ROM. The "black box" permits unlocking the flash part without the need for a cold power cycle of the computer system. The remote flash ROM and security package may provide an administrator password matching the administrator password stored in the "black box" to place the computer system in an administrator mode. The administrator mode allows for unlocking the flash part of the system ROM and changing security settings for the computer system. A system ROM thereby may be flashed remotely without the need for a user to enter an administrator password. The ROM image to be flashed to the flash part preferably includes a digital signature and certificate for authenticating the ROM image and a checksum for verifying the ROM image.

Flashing the ROM or changing a security setting in accordance with the present invention occurs as an "inband" process. Flashing a ROM or changing a security setting through an in-band process elimates the need to download a flash ROM and security package to a system partition of a fixed disk of a computer system and also the need to reboot a computer system after downloading the package to flash the ROM or change a security setting. By eliminating the need to download a flash ROM and security package to a system partition of a fixed disk, more free memory space is available on the fixed disk. Further, by eliminating the need to reboot a computer system after downloading a flash ROM and security package, a ROM may be flashed interactively at runtime or a security setting may be changed interactively at runtime.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents and patent applications are hereby incorporated by reference:

U.S. Pat. No. 4,405,829, entitled "CRYPTOGRAPHIC COMMNICATIONS SYSTEM AND METHOD," issued Sep. 20, 1983.

The following patent applications are hereby incorporated by reference:

Commonly-assigned U.S. patent application Ser. No. 08/396,343, entitled "SECURITY CONTROL FOR PERSONAL COMPUTER," filed on Mar. 3, 1995;

Commonly-assigned U.S. patent application Ser. No. 08/916,273, entitled METHOD FOR SECURELY COMMUNICATING REMOTE ACCESS COMMANDS IN A COMPUTER NETWORK, filed on Aug. 22, 1997.

Figure 1:
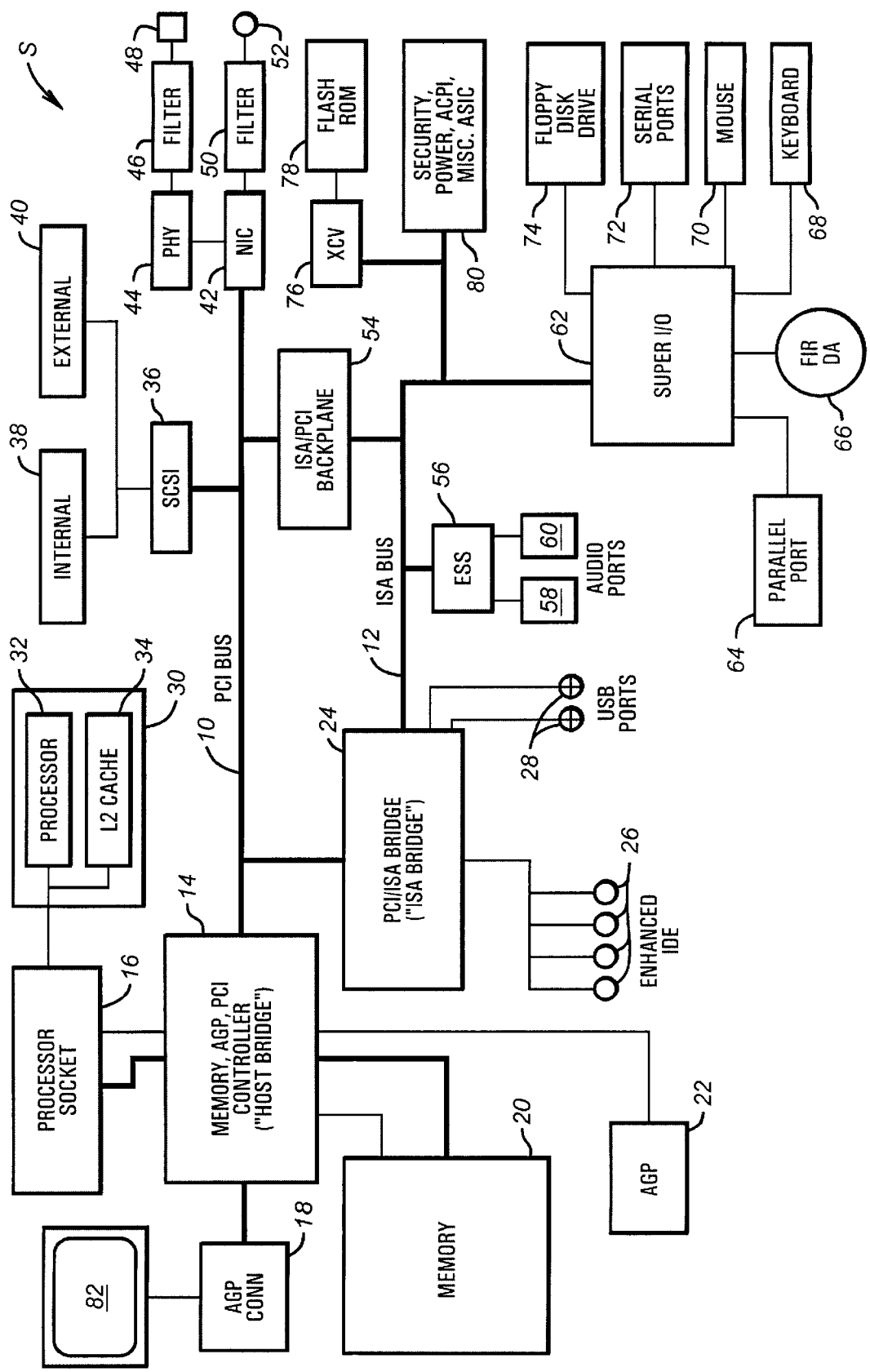
FIG. 1 is a schematic diagram of the computer system of the present invention including a flash ROM.

Commonly-assigned U.S. Pat. No. 5,953,422, entitled SECURE TWO-PIECE USER AUTHENTICATION IN A COMPUTER NETWORK, filed on December 31, 1996;

Commonly-assigned U.S. patent application Ser. No. 08/777,615, entitled METHOD FOR SECURELY CREATING, STORING AND USING ENCRYPTION KEYS IN A COMPUTER SYSTEM, filed on Dec. 31, 1996;

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the ISA bridge) bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced 11)12 drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX North Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte couple metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 36, with both an internal port 38 and an external port 40. In the disclosed embodiment, the SCSI controller 36 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse 70, a keyboard and mouse interface, additional series ports 72, and a floppy disk drive controller for a floppy disk drive 74. These devices are coupled through connectors to the Super I/O 62. The Super I/O preferably includes a non-volatile memory 75 (FIG. 16) such as a CMOS memory for storage of a power-on password and an administrator password.

The ISA bus 12 is also coupled through bus transceivers 76 to a flash read only memory (ROM) 78, which can include both basic input/output system (BIOS) code for execution by the processor 32, as well as an additional code for execution by microcontrollers in a ROM-sharing arrangement. Removable media drives are also preferably coupled to the ISA bus 12.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic. Finally, a video display 82 can be coupled to the AGP connector 18 for display of data by the computer system S. Again, a wide variety of systems could be used instead of the disclosed system S without detracting from the spirit of the invention.

Figure 2:
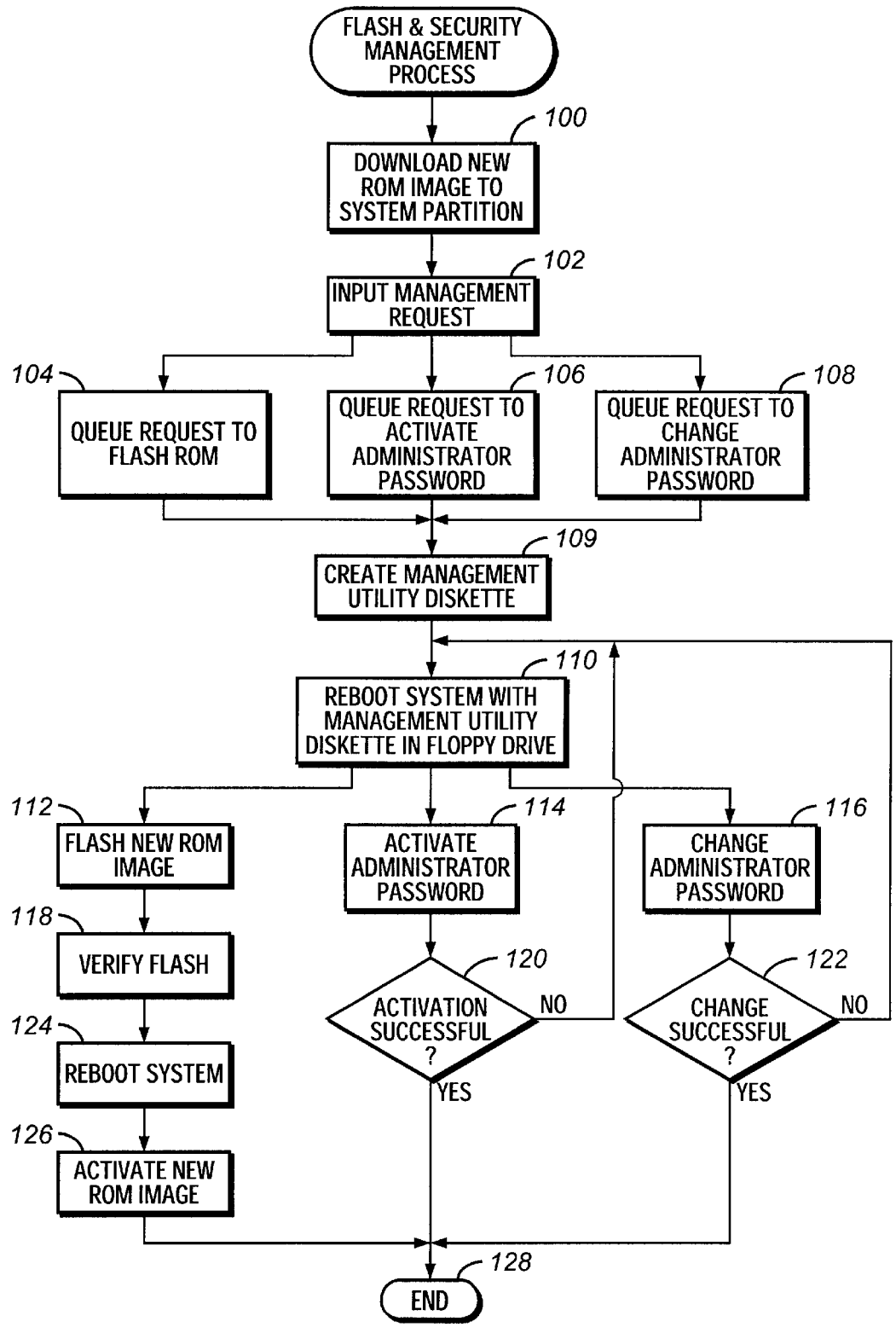
FIG. 2 is a flow chart of a flash and security management process in accordance with the prior art for a computer system including a flash ROM.

Referring to FIG. 2, a flow chart of a flash and security management process for a conventional computer system including a flash ROM in accordance with the prior art is shown. Control begins in step 100 where a new ROM image is downloaded to a system partition of the computer system. Next, in step 102, the user may input a remote management request such as a request to flash the ROM, a request to activate an administrator password, or a request to change an administrator password. If the user inputs a request to flash the ROM, the request is queued. If the user inputs a request to activate an administrator password, that request is queued in step 106. If the user inputs a request to change an administrator password, the request is queued in step 108. The user must also enter an administrator password which upon reboot serves to place the ROM in an unprotected state allowing for a ROM flash. Prior to reboot, the ROM is in a protected state preventing a flash operation to the ROM. The ROM is placed in the protected state by BIOS code during power up of the computer system. From steps 104, 106, and 108, control proceeds to step 109 where a flash and security management utility diskette is created.

Next, in step 110, the user must reboot the system with the management utility diskette in the floppy drive of the computer system. A reboot of the computer system is necessary to obtain network communication to flash the new ROM image or activate a change in an administrator password. If the queued request is a request to flash the ROM, control proceeds from step 110 to step 112 where a new ROM image is flashed to the ROM. The previous ROM image continues to be in effect after flashing the new ROM image to the ROM until a reboot occurs. Control then proceeds to step 118 where the flash is verified. Next, in step 124, the user must again reboot the computer system. Upon reboot of the computer system, the new ROM image is activated as shown in step 126.

If a request to activate an administrator password was queued by the computer system, control proceeds from step 110 to step 114 where an administrator password is activated. Control then proceeds to step 120 where it is determined if the activation of the administrator password is successful. If activation of the administrator password is not successful, control returns to step 110 where the computer system is rebooted with the management utility diskette in the floppy drive. If activation of the administrator password is successful in step 120, control proceeds to step 128 where the management process is terminated. If a request to change an administrator password was queued by the computer system, control proceeds from step 110 to step 116 where the administrator password is changed. Next, in step 122, it is determined whether the change of the administrator password is successful. If the change is not successful, control returns to step 110 where the computer system is rebooted with a management utility diskette in the floppy drive. If the change to the administrator password is successful, control proceeds to step 128 where the management process is terminated.

Figure 3A:
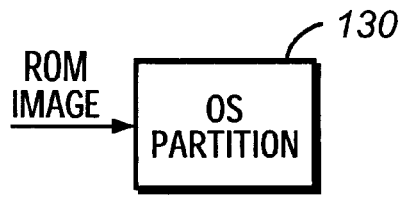
FIGS. 3A–3B are schematic diagrams of a ROM image being downloaded to an operating system partition or a dedicated system partition in accordance with the prior art.
Figure 3B:
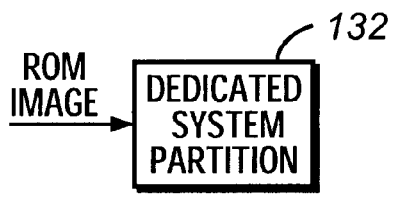
Figure 4:
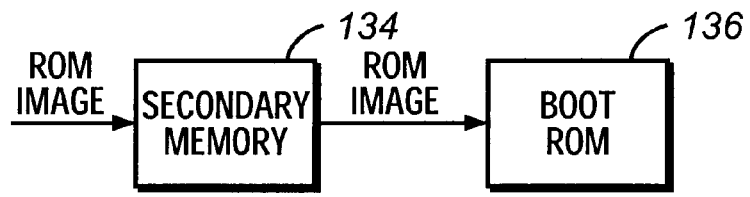
FIG. 4 is a schematic diagram of a ROM image being downloaded to a secondary memory and then copied to a boot ROM in accordance with the prior art.

Referring to FIGS. 3A–3B, conventional ways for storing a new ROM image are shown. In accordance with a conventional flash and security management process, the ROM image may be stored to either an operating system partition 130 or a dedicated partition 132. FIG. 4 similarly illustrates another means for storing a ROM image in accordance with a conventional management process. In particular, a ROM image may be stored to a secondary memory 134 and then copied to a boot or system ROM 136.

Remote Management Setup Process

Referring to FIGS. 5A–5G, the remote management setup process in accordance with the present invention for a computer system with a flash ROM 78 is shown. Control begins at step 200 where a system administrator copies the latest ROM image to the ROM directory of the administrator's computer system if the system administrator is seeking to perform a remote flash. Next, in step 202, the administrator launches the remote management setup utility according to the present invention.

The administrator then has the option in step 204 of selecting to create a remote security package or the option in step 216 of selecting to create a remote flash package. If the administrator desires to update the security settings for a set of target computer systems, creating a remote security package should be selected. If the administrator desires to flash a new ROM image to a set of target computer systems, the administrator should select to create a remote flash package. It is noted that the same administrator password is stored on each target computer system S prior to initiating the remote management setup process.

Figure 6A:
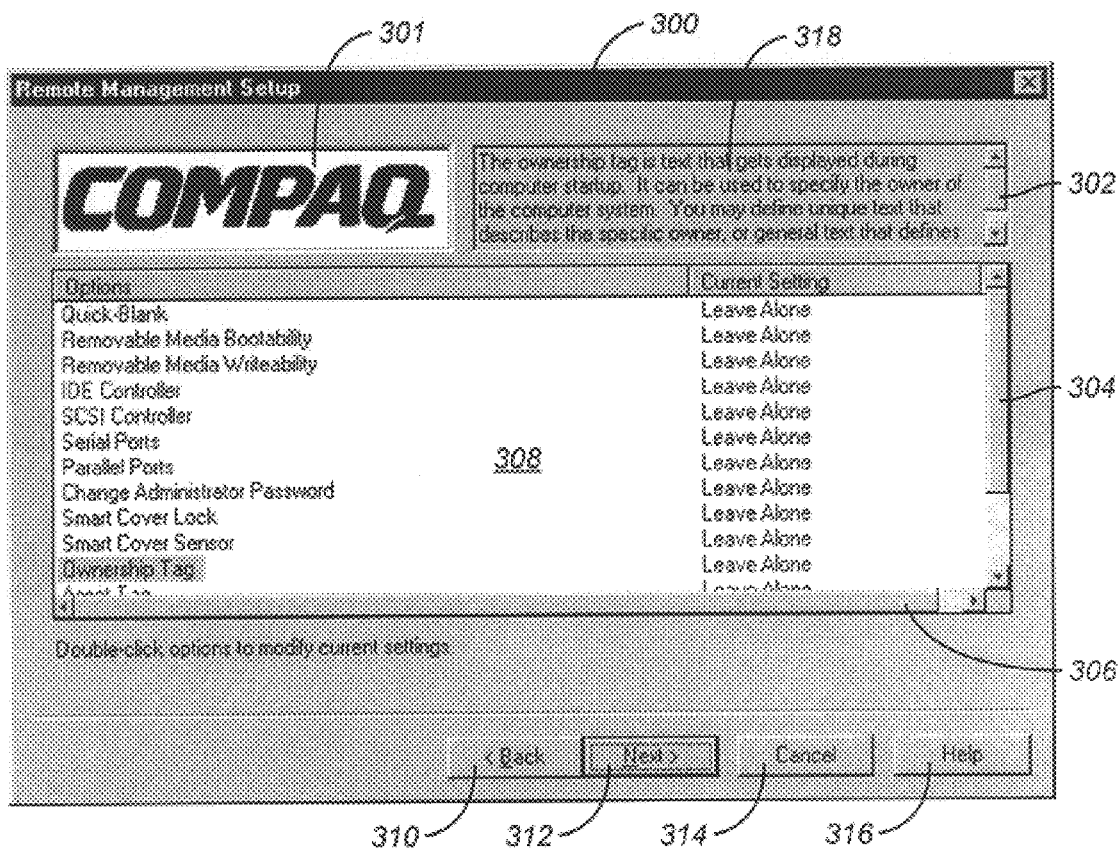
FIGS. 6A–6E are illustrations of the remote management dialog boxes provided in accordance with the remote management setup process of FIGS. 5A–5B.

From step 204 in which creating a remote security package is selected, control proceeds to step 206 in which the administrator is prompted to enter the security options template filename. Control then proceeds to step 207 where a security options dialog box 300 is displayed to the administrator. Referring to FIG. 6A, an example of a security options dialog box 300 is shown. The main window 308 of the dialog box 300 displays the security options and the current setting or each option. The options may for example include a Quick-Lock mode option for disabling a keyboard and mouse interface from within an application, a Quick-Blank mode option for blanking a video display 82 from within an application, a removable media bootability option for preventing a user from booting the computer S from the removable media drives, a removable media writeability option for preventing a user from writing to the removable media drives, an IDE controller option for preventing a user from booting the computer system S from the fixed drives 26 connected to the IDE controller, a SCSI controller option for preventing a user from booting the computer system S from the devices connected to the SCSI controller 36, a serial port option for preventing a user from transferring data through the integrated serial interface 72, a parallel port option for preventing a user from transferring data through the integrated parallel interface 64, a USB port option for preventing a user from transferring data through the integrated USB interface 28, an option to change the administrator password, a smart cover lock option for inhibiting access to the interior of the computer system S to prevent unwanted configuration changes or component removal, a smart cover sensor option to alert a user when the computer cover or side panel has been removed, an option to change the ownership tag which specifies the owner of the computer system S, and an option to change the asset tag which is a unique number or text string such as an owner's property identification number used to help track the specific computer system S.

Vertical movement of the main window 308 may be controlled by a vertical scroll bar 304, and horizontal movement of the main window 308 may be controlled a horizontal scroll bar 306. The main window 308 may also be controlled by clicking on a back window button 310 for selecting the previous security setting option and by clicking on a next window button 312 for selecting a next security setting option. If the administrator wishes to cancel selection of the security options, the administrator may click a cancel window button 314. If the administrator desires assistance in selecting security options, the user may click on a help window button 316. Further, the administrator may modify the current setting of any selected security setting option by double-clicking with the pointing device 70.

Figure 6B:
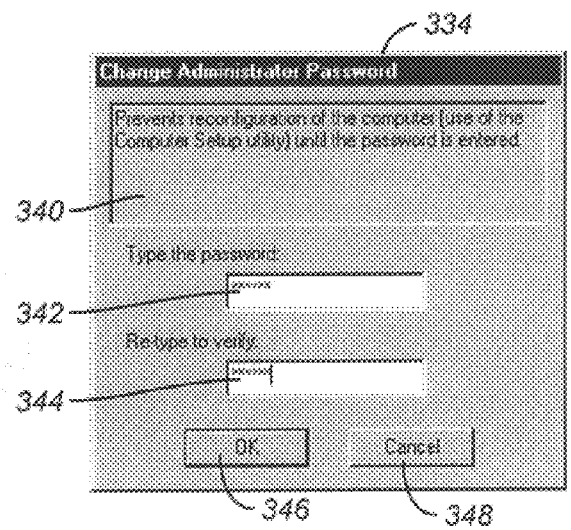
Figure 6C:
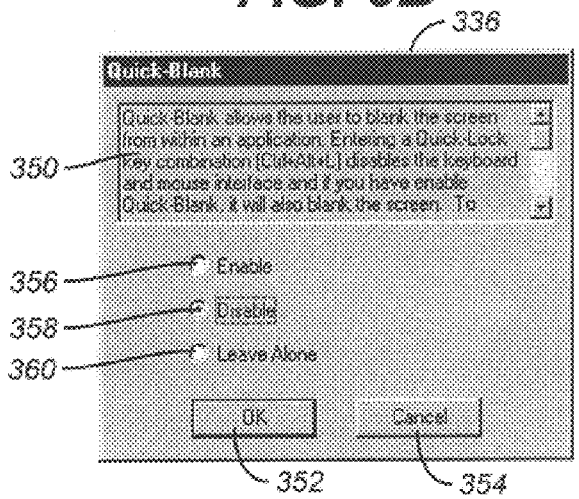
Figure 6D:
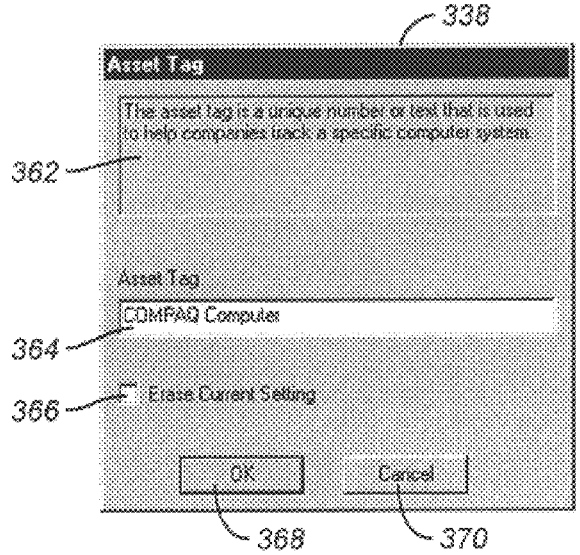

Referring to FIGS. 6B–6D, examples of security setting dialog boxes which are displayed to the administrator after double-clicking on a security setting are shown. If the administrator double-clicks on the change administrator password option, a change administrator password dialog box 334 is displayed to the administrator. FIG. 6B shows an example of a change administrator password box 334. The dialog box 334 includes a description window 340 which describes the functionality of the administrator password. The dialog box 334 also includes a password entry field 342 for entry of the administrator password and a password verification field 344 for a second entry of the administrator password. The administrator has the option of saving the configuration of the administrator password by clicking on an OK window button 346 and the option of cancelling the configuration of the administrator password by clicking on a cancel window button 348.

If the administrator double-clicks on the quick-blank mode option, a quick-blank dialog box 336 is displayed to the administrator. FIG. 6C shows an example of a quick-black dialog box 336. The dialog box 336 includes a description window 350 which describes the functionality of the quick-blank feature. The dialog box 336 also includes a field 356 for enabling the quick-blank mode and a field 358 for disabling the quick-blank mode. There is also a field 360 designated "Leave Alone" as a null or default option for neither enabling or disabling the quick-blank mode with the utility. The administrator may save the configuration of the quick-blank mode option by clicking on an OK window button 352. The administrator may cancel a configuration of quick-blank mode option by clicking on a cancel window button 354.

If the administrator double-clicks on the asset tag option in the security options dialog box 300, the asset tag dialog box 338 is displayed to the administrator. FIG. 6D shows a example of an asset tag dialog box 338. The dialog box 338 includes a description window 362 for describing the asset tag. The dialog box 338 also includes a field 364 for entry of the asset tag. The exemplary asset tag provided in the field 364 is "COMPAQ Computer." In addition the dialog box 338 includes a field 366 for erasing the current setting of the asset tag. If the user desires to save the asset tag configuration, the user may click on an OK window button 368. If the user wishes to cancel the configuration of the asset tag, the user may click on a cancel window button 370. A dialog box is preferably provided for each security option. Further, each remote management dialog box may include typical features of a dialog box. The back, next, cancel, finish, and help buttons of a dialog box are defined by the operating system. Also, each dialog box preferably uses a wizard dialog format which is known in the art.

Returning to FIG. 5A, control next proceeds from step 207 to step 208 in which the administrator is prompted to indicate if the selected file is correct. If the administrator indicates that the selected file is incorrect, control returns to step 206 for the administrator to re-enter a security options template filename. If the administrator indicates that the selected file is correct, control proceeds to step 210 where the administrator is prompted to enter the administrator password. After a valid administrator password is entered, control proceeds to step 212 in which a security options summary dialog box 320 is displayed to the administrator. An example of a security options summary dialog box 320 is shown in FIG. 6E. The dialog box 320 provides a summary of the security options for a security options template file. An administrator may return to the security options dialog box 300 to modify a setting of a security option by clicking on a back window button 324. If the administrator wishes to cancel the particular configuration of security options, the administrator may click a cancel window button 328. If the administrator desires assistance in selecting a security options configuration, the administrator may click on a help window button 330. The dialog box 320 also presents the administrator with the option to click a finish window button 326 to save the security options configuration and the option to click a cancel window button 328 to cancel the security options configuration. If the administrator cancels the security options configuration, the remote management setup process terminates through step 214. The administrator is preferably prompted to verify an intent to exit the utility. If the administrator saves the security options configuration, control proceeds to step 228 of FIG. 5B.

From step 216 in which creating a remote flash package is selected, control proceeds to step 218 in which the administrator is prompted to enter the ROM image filename. Control then proceeds to step 220 in which the administrator is prompted to indicate if the selected file is correct. If the administrator indicates that the selected file is incorrect, control returns to step 218 for the administrator to re-enter a ROM image filename. If the administrator indicates that the selected file is correct, control proceeds to step 222 where the ROM image in the ROM image file 802 (FIGS. 9–10) is given a digital signature.

Figure 7:
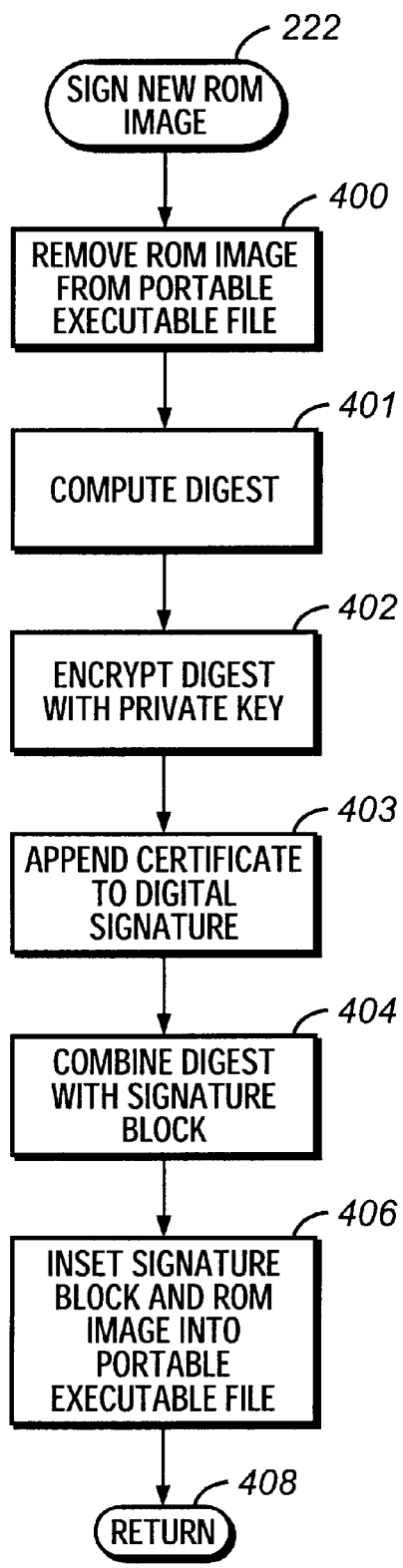
FIG. 7 is a flow chart of the process for signing and encrypting a ROM image in accordance with the present invention.

Referring to FIG. 7, a method for signing and encrypting a ROM image is shown. Beginning at step 400, the ROM image is removed from its portable executable file. Next, in step 401, a cryptographically secure digest is computed by running the ROM image through a hash function also known as a message digest function. The hash function produces a digest which serves as a digital fingerprint of the ROM image. Preferably, the hash function is a one-way hash function performed in a secure manner resistant to snooping or attack by malicious code. Contemplated methods for accomplishing the secure one-way hash function include those illustrated in the commonly-assigned U.S. patent entitled SECURE TWO-PIECE USER AUTHENTICATION IN A COMPUTER NETWORK and the commonly-assigned U.S. patent application entitled "METHOD FOR SECURELY CREATING, STORING AND USING ENCRYPTION KEYS IN A COMPUTER SYSTEM,≅ both previously incorporated by reference.

Next, control proceeds to step 402 where the digest is encrypted with a private key. Encrypting the digest creates a digital signature for the ROM image. The digital signature serves to provide verification that the ROM image originated from the ROM image publisher and that the ROM image has not been altered. The digest cannot be restored to its original form without a public key. While a public key is published and available to third parties, a private key is known only to the ROM image publisher. Knowledge of the public key to be used for decryption does not provide knowledge of the private key used for encryption. The encryption algorithm is; preferably a 40-bit or larger encryption algorithm subject to U.S. export restrictions on cryptographic software. An example of a suitable public key/private key encryption algorithm is an algorithm according to the RSA encryption standard. The RSA crpytosystem is described in U.S. Pat. No. 4,405,829, entitled CRYPTOGRAPHIC COMMUNICATIONS SYSTEM AND METHOD, granted Sep. 20, 1983, which is previously incorporated by reference.

From step 402, control proceeds to step 403 where the digital signature is appended to a certificate forming a signature block. A certificate is a signed document attesting to the identity and public key of the party used by the ROM image provider to send the ROM image. The purpose of a certificate is to prevent a third party from impersonating the sender by using a fraudulent public/private key pair. The certificate holds the name of the publisher or provider of the ROM image, the name of the certificate authority, and a public key distributed by that certificate authority which may be used to decrypt the digest. Control next proceeds to step 404 where the digest is combined with the signature block. Next, control proceeds to step 406 where this signature block and ROM image are inserted into the portable executable file from which the ROM image was removed. From step 406, control returns through step 408.

Returning to FIG. 5A, control next proceeds to step 224 where the administrator is prompted to enter the administrator password. After a valid administrator password is entered, control proceeds to step 226 in which a remote ROM flash summary dialog box is displayed to the administrator. The dialog box also provides a summary of what will occur if the administrator proceeds with the remote set up process. The dialog box includes a cancel button and a save button. If the administrator clicks on a cancel button, the setup process terminates through step 214. If the administrator clicks on a save button, control proceeds to step 228.

Figure 5A:
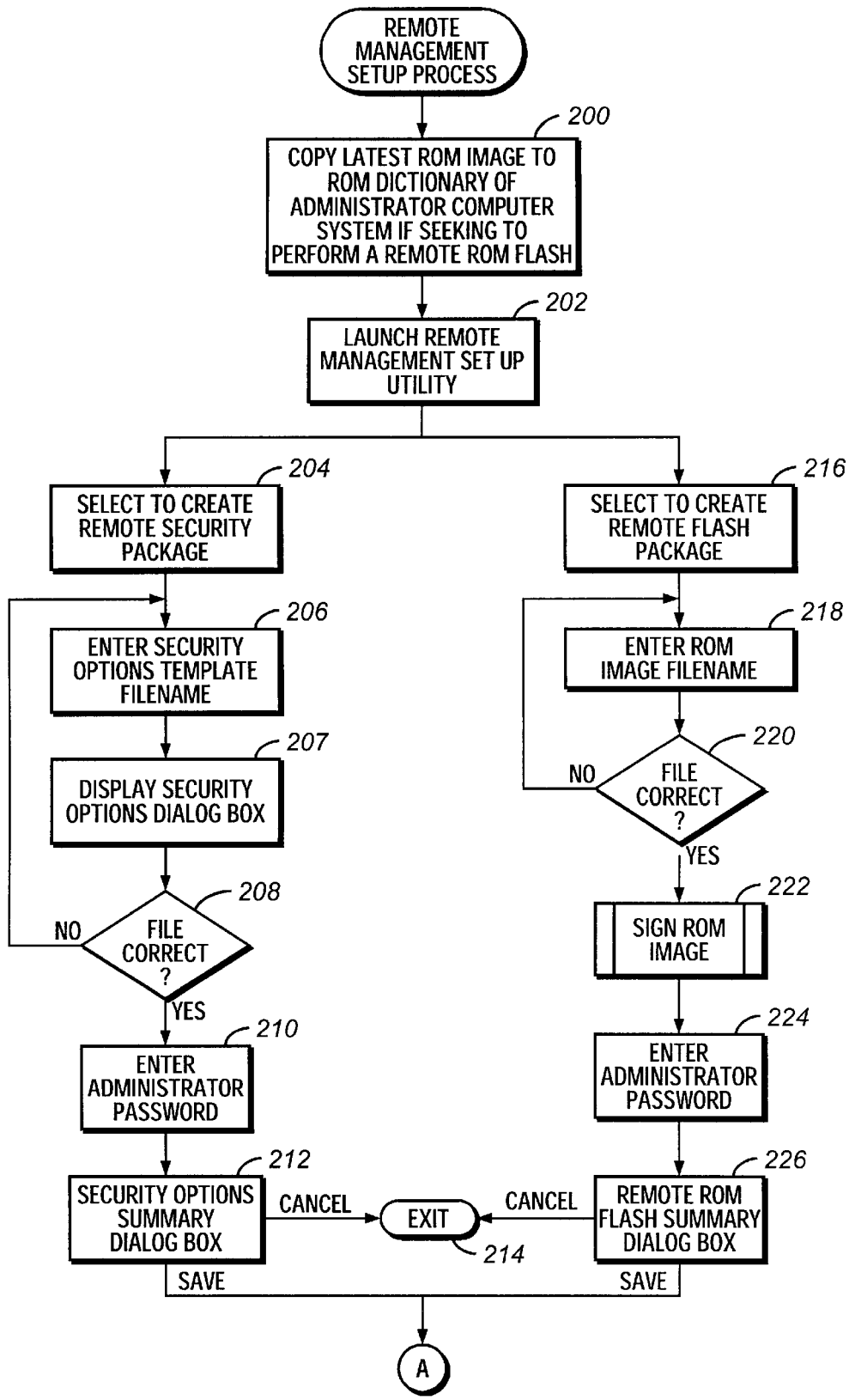
FIGS. 5A–5B are flow charts of the remote management setup process for the computer system of FIG. 1 in accordance with the present invention.
Figure 5B:
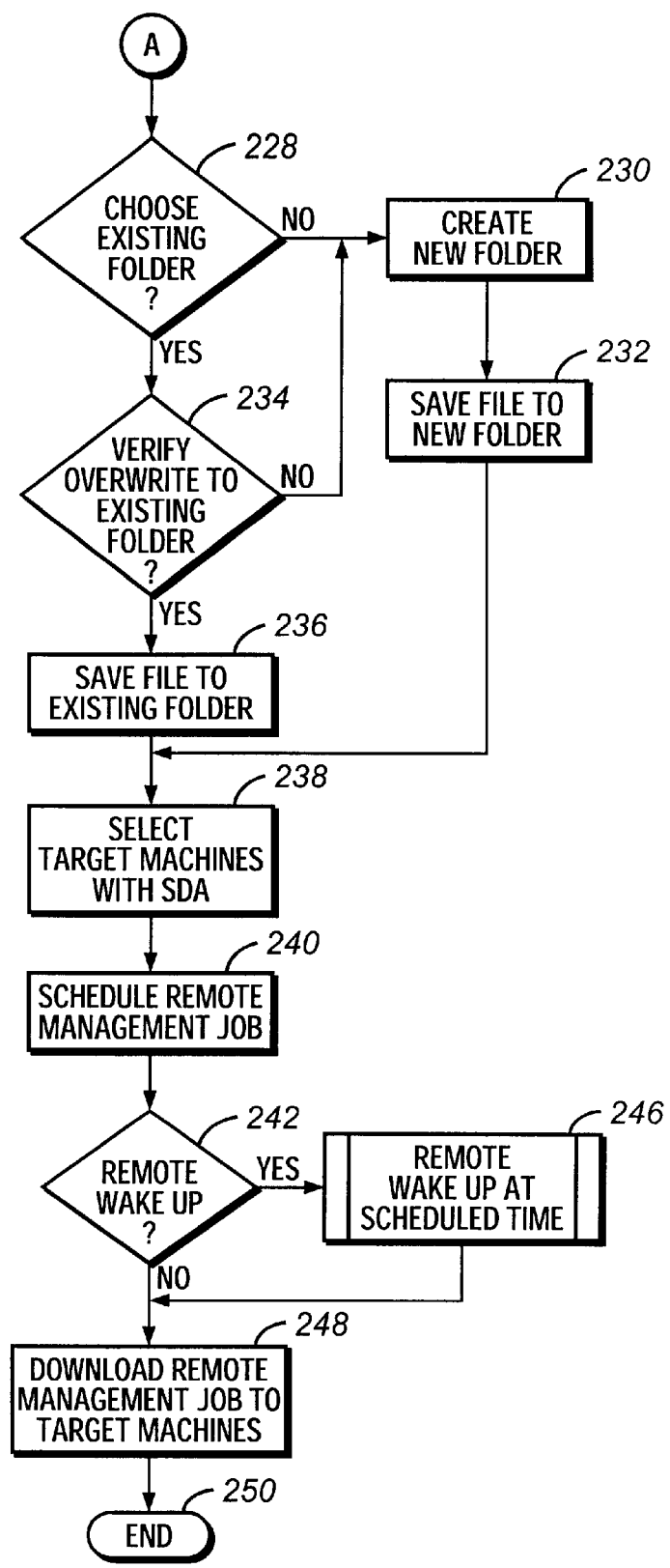
Figure 6E:
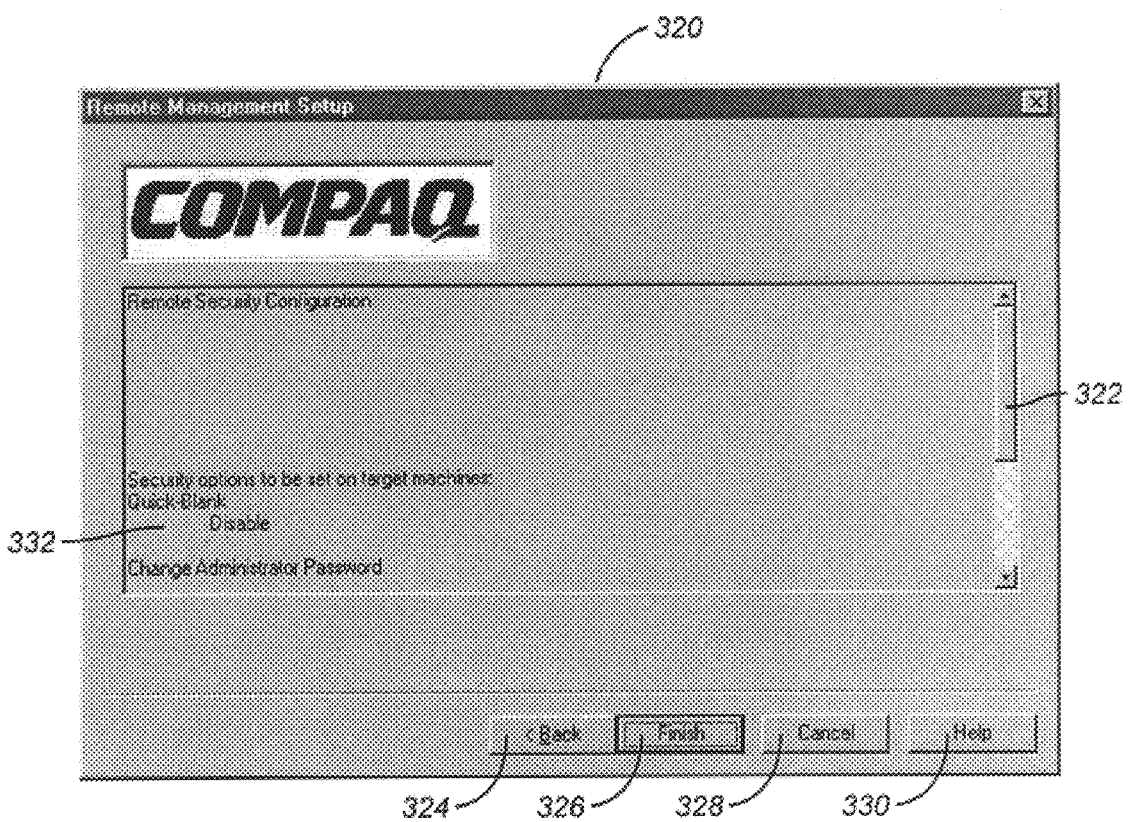

Referring to FIG. 5B, next, in step 228, the administrator is prompted as to whether the file is to be saved to an existing folder. If the administrator indicates not to choose an existing; folder, control proceeds to step 230 where a new folder is created. From step 230, control proceeds to step 232 in which the file is saved to the new folder. If the administrator selects to save the file to the existing folder in step 228, control proceeds to step 230 in which the user is prompted to verify the overwrite of the existing folder. If the user indicates not to overwrite the existing folder, control returns to step 230 where a new folder is created. If the user indicates to proceed to overwrite the existing folder, control proceeds to step 236 in which the selected file is saved to the existing folder.

From, step 236 and step 232, control proceeds to step 238 in which the administrator is prompted to select the target machines to receive the selected file. The selection is preferably made using a software distribution application (SDA). Examples of SDAs include the System Management Server (SMS) available from Microsoft Corporation and the LanDesk Workgroup Manager available from Intel Corporation. Next, in step 240, the administrator schedules the remote management job. Control then proceeds to step 242 in which the administrator indicates if a remote wake-up is desired. A remote wake-up is the process by which a target computer system is remotely powered up. If a remote wake-up is not set, control proceeds to step 248 where the remote management job is downloaded to the target machines. It should be understood that a download of the remote management job may be initiated by a system administrator or by the user. If a remote wake-up is set in step 242, control proceeds to step 246 where a remote wake-up is initiated at the scheduled time.

Figure 8A:
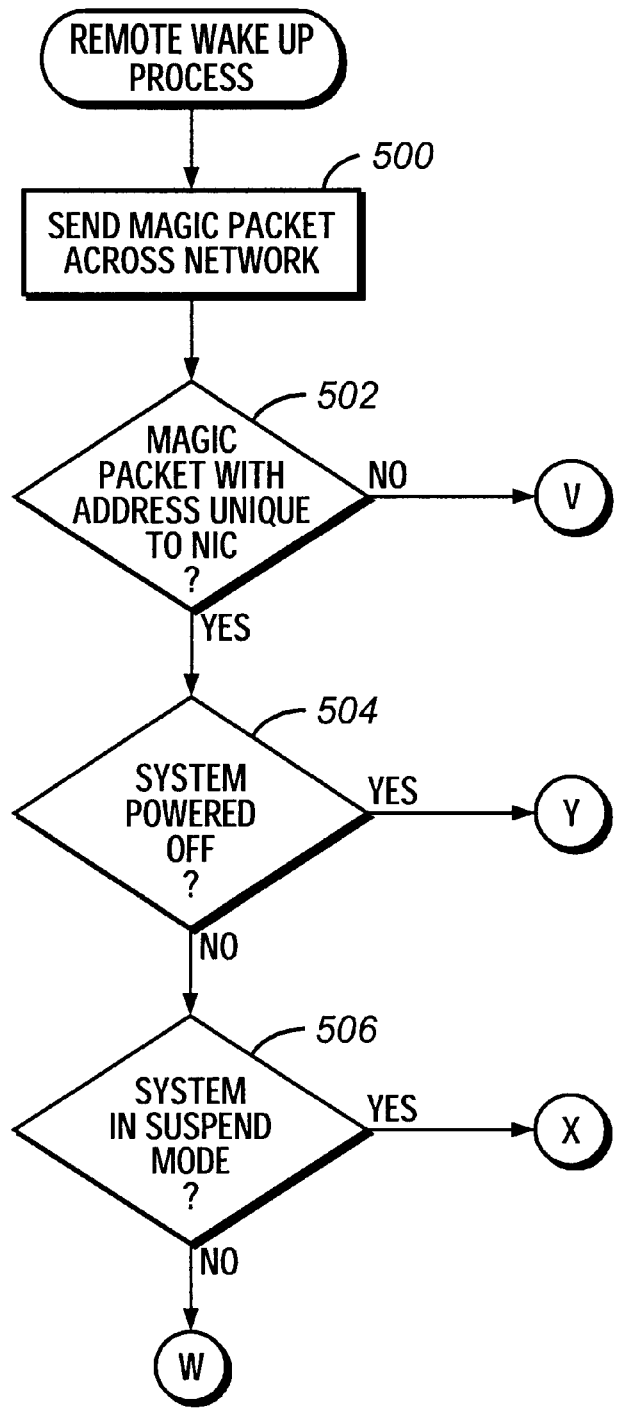
FIGS. 8A–8C are flow charts of a remote wake-up process in accordance with the present invention.
Figure 8B:
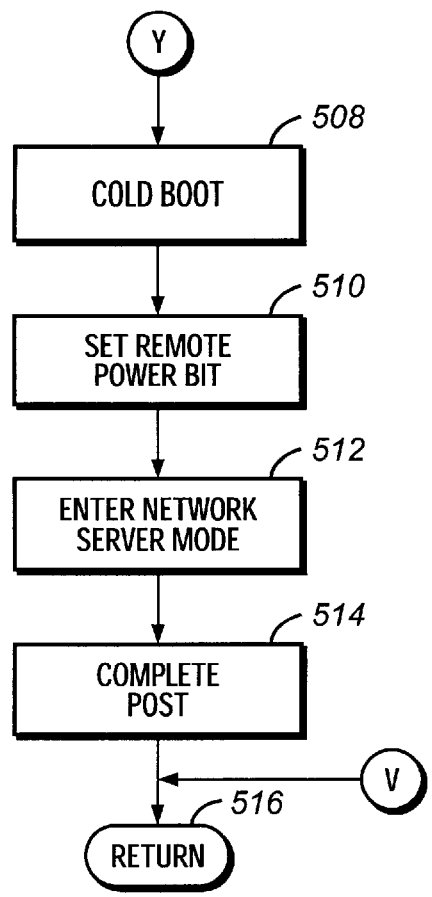
Figure 8C:
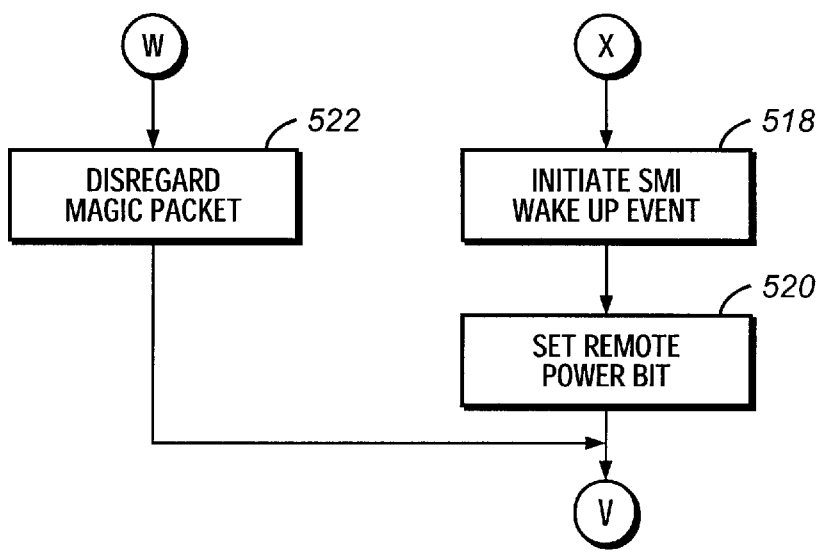

Referring to FIGS. 8A–8C, the process of remotely powering up a target computer system S in accordance with the present invention is shown. Beginning at step 500, a Magic Packets is sent across a network. Each computer system S on the network is preferably implemented according the Magic Packet specification. For example, each computer system S should include a network interface controller (NIC) identified with a unique address and power management hardware/software that functions to power the NIC when the Magic Packet mode is enabled. Magic Packet mode is further described in the Magic Packet specification which is hereby incorporated by reference.

In step 502, each target computer system S determines if the transmitted Magic Packet includes an address unique to the NIC of the computer system S. If the Magic Packet address is not unique to a target computer system S, control ends for that computer system S through step 516. If the Magic Packet address is unique to a target computer system S, control proceeds to step 504 where it is determined if the target computer system S is presently powered off. If the system S is presently powered off, control proceeds to step 508 (FIG. 8B) where a cold boot of the computer system S is performed. Next, control passes to step 510 where a remote power bit is set. This bit serves to indicate that the target computer system S was remotely powered. Next, control proceeds to step 512 where the computer system S enters a network server mode. In the network server mode, the keyboard and mouse interface of the computer system S is disabled.

Control next passes to step 514, where POST is completed. From step 514, control returns through step 516.

If the target computer system S is not presently in a powered off state, control proceeds from step 504 to step 506 (FIG. 8A). In step 506, it is determined whether the computer system S is presently in a suspend power mode. Features of the suspend mode of a computer system are well known in the art. If the computer system S is in a suspend mode, control proceeds to step 518 where a SMI wake-up event is initiated (FIG. 8C). From step 518, control proceeds to step 520 where the remote power bit is set. Next, control returns through step 516. If the target computer system S is not presently in suspend mode at step 506, the computer system S is either in a standby mode or a power on mode. In either case, control proceeds to step 522 (FIG. 8C) where the particular Magic Packet is disregarded. From step 522, control terminates through step 516. Further details concerning remotely powering a computer system responsive to a MagicPacket are described in commonly-owned patent application, entitled METHODS FOR SECURELY COMMUNICATING REMOTE CONTROL COMMANDS IN A COMPUTER NETWORK, previously incorporated by reference. Returning to FIG. 5B, from step 246 control passes to step 248 where the remote management job is downloaded to the target machines S. An SDA may be used to deliver the remote management job or package over a network to the target systems S. From step 248, control terminates through step 250.

Remote Management Package

Figure 9:
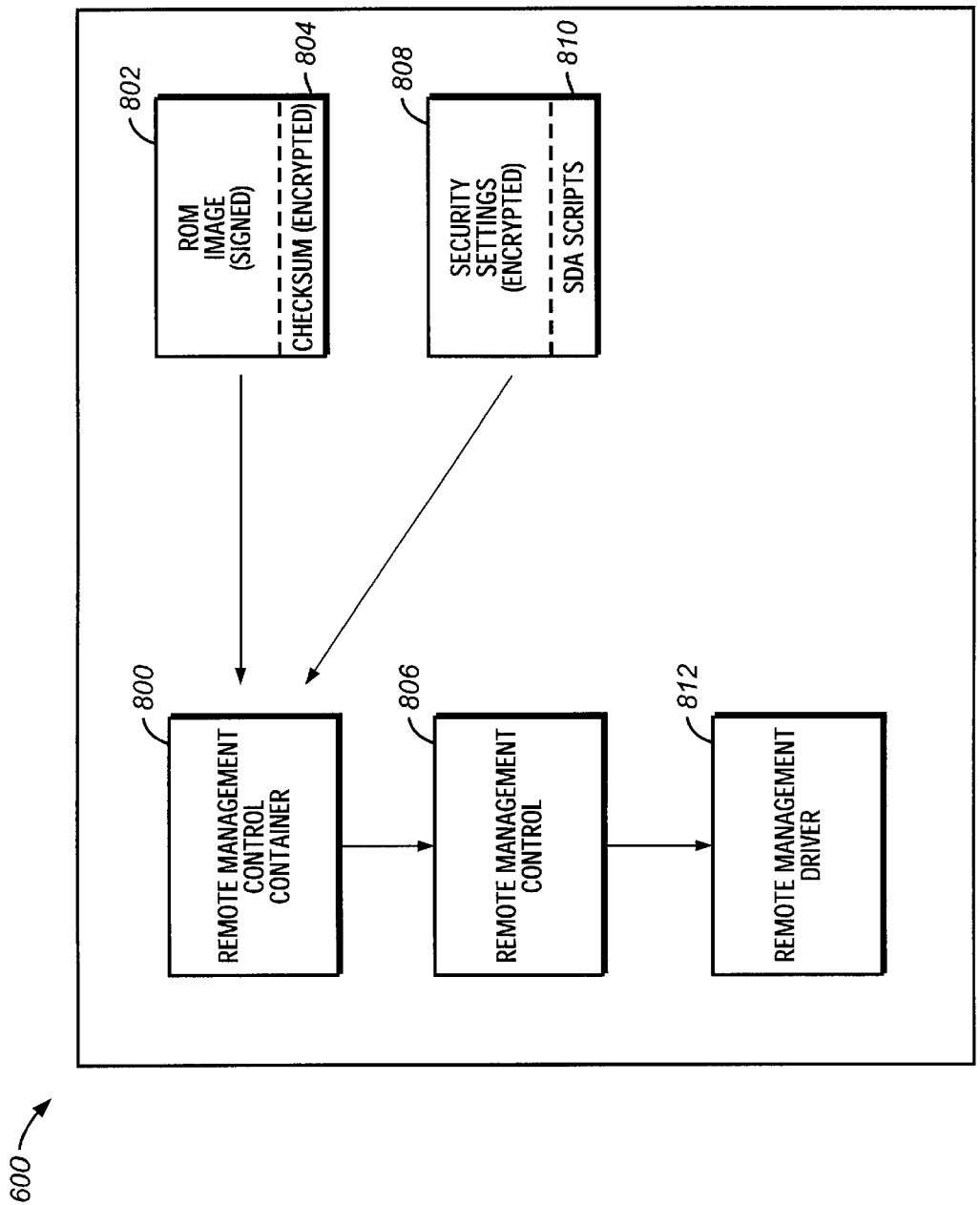
FIG. 9 is a schematic diagram illustrating an exemplary embodiment of the remote management packaging process and the remote management package of the present invention.

Referring to FIG. 9, a schematic diagram of an exemplary software packaging process for generating a remote management package of we present invention is shown. A remote management package 600 may include a remote management control container 800, a remote management control 806, a remote management driver 812, a ROM image file 802, and a security settings file 808. The control container 800 is used to house the other components of the remote management package 600. The control container 800 is preferably an Active X control container, and the remote management control 806 is preferably an Active X control. An Active X control container is a control container substantially compliant with an Active X controls specification, and an Active X control is a control substantially compliant with an Active X controls specification. In the disclosed embodiment, the Active X control container is an .exe file and the Active XS control is an .ocx file.

A brief explanation of the operation of an Active X control and Active X control container is useful. An Active X control, formerly known as an Object Linking and Embedding (OLE) control or an OLE custom control (OCX), is distinct code capable of storing its data an a web page and capable of being loaded from a web server. An Active X control container, which houses the Active X control, may be an application or a web browser. An example of a web browser capable of housing an Active X control is the Internet Explorer[7] web browser available from Microsoft Corporation. The Active X control provides defined interfaces and services between an Active X control and an Active X control container. An Active XS control includes methods for performing certain functions. An Active X control container makes a request of an Active X control by invoking the methods of the Active X control. An Active X control makes a request of an Active X control container by sending an event to the control container. When an Active X control sends an event, the control acquires a pointer to an interface supported by the container, and the methods in that interface must match the event that the control sends. Further details concerning an Active X control and an Active X control container may be obtained from an Active X controls specification.

The remote management control 806 is the code for controlling a remote management flash or remote management security option of the present invention. The ROM image file 802 may be any type of portable executable file. For example, the ROM image file 802 may be a CAB file or a .OCX file. The ROM image file 802 is given a digital signature in accordance with the signing process of FIG. 7 as described above. It should be understood that if desired software components of the remote management package 600 other than the ROM image may also be given a digital signature. The ROM image file 802 also preferably includes an encrypted checksum 804 for verifying the ROM image 802. Further, the ROM image 802 is encrypted ill accordance with the encryption process of FIG. 7 as described above. Sensitive information within the security settings file 808 (e.g. the administrator password or a settings bit-mask/ data structure) of the remote management package 600 is preferably encrypted. It should be understood that if desired software components of the remote management package 600 other than the security settings file 808 may be encrypted. The securities settings file 808 also preferably includes system distribution application (SDA) scripts allowing for automatically invoking the remote management control 806. The remote management package 600 may also include the remote management driver 812. Alternatively, if the remote management driver 812 is resident to the target computer system S, the remote management package 600 need not include the remote management driver 812. The remote management driver 812 is implemented to be compatible with the particular operating system used by the target computer system S.

It should be understood that te remote management package 600 may or may not include a ROM image file 802 and security settings file 808, depending upon the remote management option to be executed. If the remote management option is a remote flash option, a security settings file may need not be included in the remote management package 600. The package 600, however, should include a file containing the administrator password to allow for unlocking the ROM 78. If the remote management option is a remote security option, the remote management package 600 need not include a new ROM image 802. It should thus be understood that the particular software components of a remote management package 600 to be delivered to a target computer system S depend both upon the selected remote management option and the software components already present on the target computer system S. Moreover, if a remote wake-up is being used for the target system S, the remote management package 600 includes a remote wake-up utility housed in a portable executable file. The remote management package 600 may also include a reference text file containing the contents of the summary dialog boxes configured during the remote management setup process of FIGS. 5A–5B and a file containing a URL pointing to the location of the ROM image file 802. The remote management package 600 also includes a utility to verify the digital signature of the ROM image.

Figure 10:
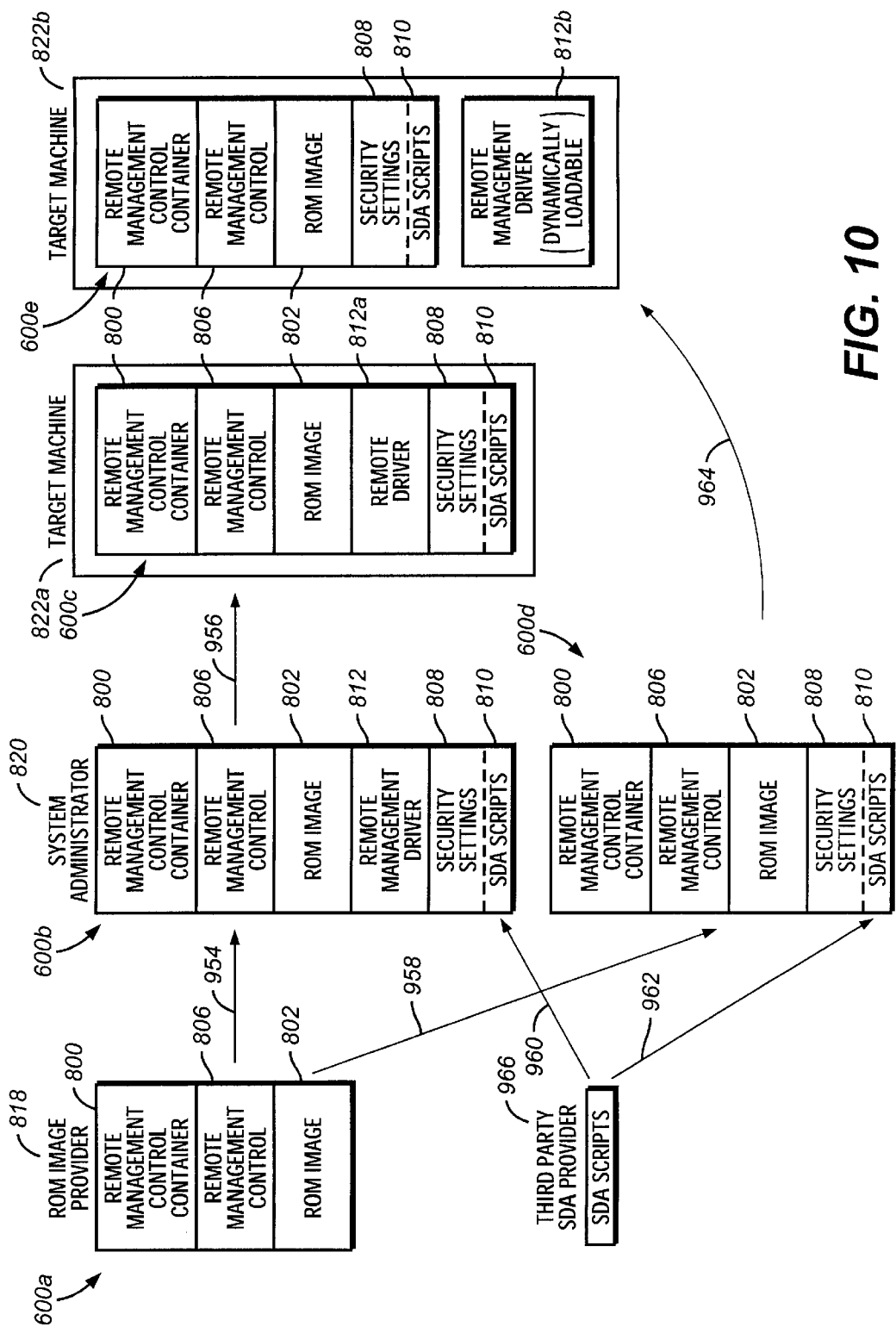
FIG. 10 is a schematic diagram of two exemplary embodiments of the process for forming and delivering a remote management package of the present invention.

Referring to FIG. 10, two embodiments of the process for packaging and delivering the remote management package 600 are shown. The remote management package 600 is initially created by a ROM image provider 818. The package 600*a* of the first embodiment includes the remote management control container 800, the remote management control 806, and the ROM image file 802. In step 954, the ROM image provider 818 provides the remote management package 600*a* to the system administrator 820. The system administrator 820 adds a remote management driver 812 and a securities settings file 808 to the remote management package 600*a* forming the remote management package 600*b*. The securities settings file 808 preferably includes SDA scripts 810 provided from a third party SDA provider 966. Next, the system administrator 820 provides the remote management package 600*b* in step 956 to the target machine 822*a*. The remote management package, once delivered to the target machine 822*a*, is designated 600*c*. The SDA scripts 810 allow for remote execution of the remote management package 600*c* on the target machine 822*a*.

FIG. 10 also illustrates a second embodiment of the process for packaging and delivering the remote management package 600 according to the present invention. In step 958, the ROM image provider 818 provides the remote management package 600*a* to the system administrator 820. The system administrator 820 adds the securities settings file 808 to the remote management package 600*a* forming the remote management package 600*d*. The security settings file 808 preferably includes SDA scripts 810 provided in step 962 by a third party SDA provider 966. The remote management package 600*d* differs from the remote management package 600*b* in that the remote management package 600*d* does not include the remote management driver 812. In step 964, the system administrator 820 provides the remote management package 600*d* to the target machine 822*b*. The remote management driver 812 is not included in the remote management package 600*d* because a remote management driver 812*b* is resident to the target machine 822*b*. The remote management driver 812*b* resident to the target machine 822*b* is dynamically loadable so that a reboot of the computer system 822*b* is not necessary in order to load the remote management driver 812*b*. It should be understood that other embodiments of the remote management packaging and delivery process of the present invention are possible. For example, if a target computer system S already includes the remote management driver 812, the remote management control container 800, and the remote management control 806, then a remote management package 600 may include only the ROM image file 802 and the security settings file 808.

Figure 11:
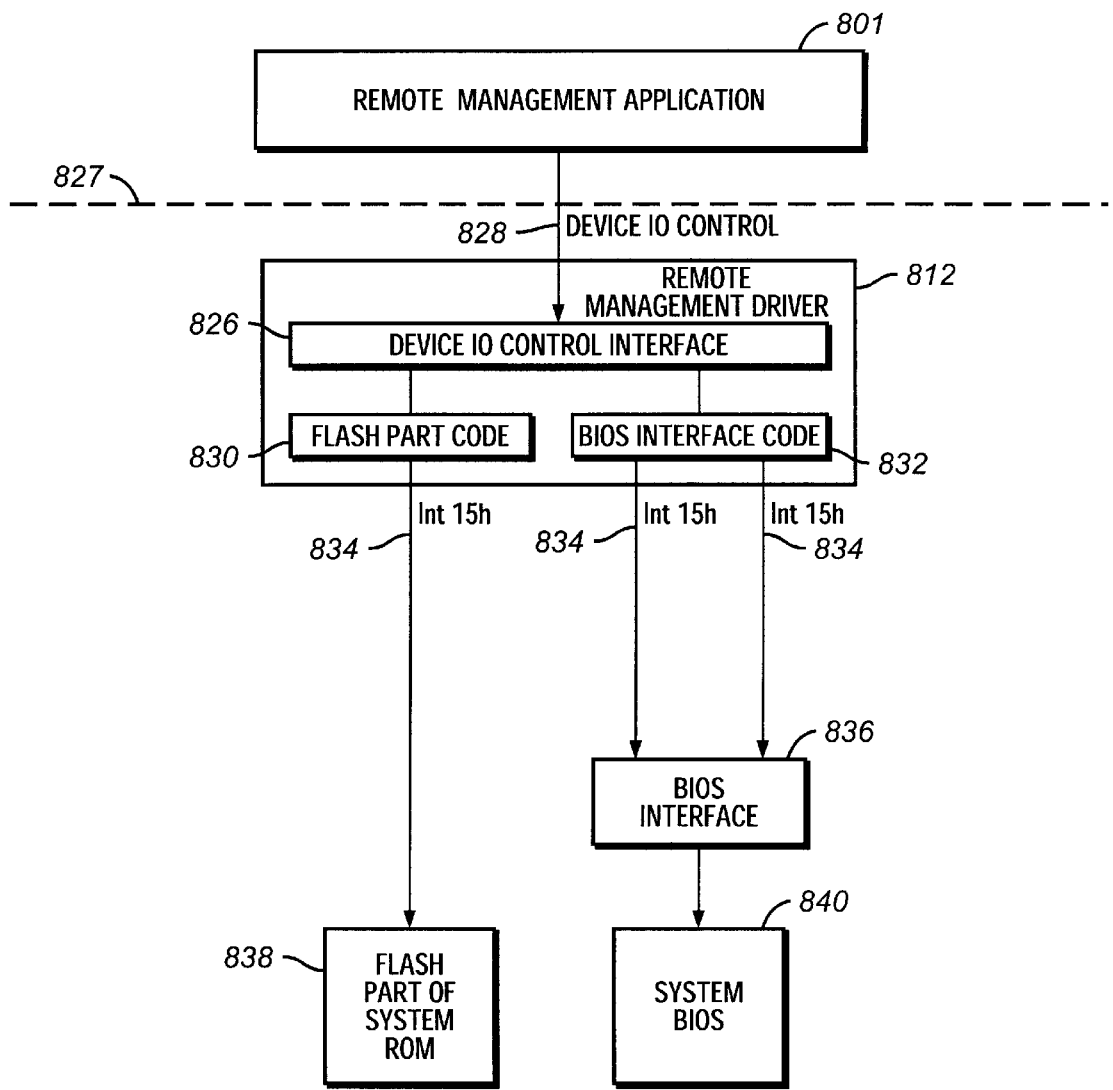
FIG. 11 is a schematic diagram of the remote management architecture according to the present invention.

Referring to FIG. 11, a schematic diagram of the remote management architecture the present invention is shown. A remote management application 801 is defined as being the remote management control container 800 when housing software components other than the remote flash driver 812, such as the remote management control 806, the ROM image file 802, and the security settings file 808. The remote management driver 812, which receives directed system control calls from the remote management application 801 in the form of a DeviceIoControl command 828, serves as an IoControl (IOCTL) interface for both a remote ROM flash and a, remote configuring of a security setting. For a remote ROM flash, the driver 812 interfaces with a BIOS interface 836 through an INT 15h tri-modal call 834. The BIOS interface 836 is preferably a BIOS32 Client Management Interface providing a method of validating en administrator password and entering an administrator mode of the target computer system S. The driver 812 uses the BIOS interface to send the password to system BIOS 840. In an administrator mode, the ROM 78 may be flashed or a security setting may be changed. For remote security administration, a security management call to set a security setting in the form of an INT 15h tri-modal call 834 is passed from the remote management driver 812 through the BIOS interface 836 to the system BIOS 840. For a remote ROM flash, a ROM call to program a flash part 838 of the flash ROM 78 is passed from the remote management application 801 across an application interface 827 to device IOCTL interface code 826 of the remote management driver 812. The ROM call is then passed in the form of an INT 15h tri-modal call 834 from the remote management driver 812 to the flash part 838 of the flash ROM 78. The device IOCTL interface between the remote management application 801 and the remote management driver 812 allows for a single thread for communication between the application 801 and driver 812. To communicate with the driver 812, the application 801 passes a single DeviceIoControl command 828 to the driver 812. The application interface 827 between the application 801 and driver 812 may for example be the Win32 DeviceIoControl API function. The parameter types, input parameters, and description of input parameters for the Win32 DeviceIoControl API function are given below:

| HANDLE | hDevice; | handle of device |
|---|---|---|
| ULONG | UIIoControlCode; | control code of operation to perform |
| LPVOID | IpvInBuffer; | address of buffer for input data |
| ULONG | IcbInBuffer; | size of input buffer |
| LPVOID | IpvOutBuffer; | address of output buffer |
| ULONG | IcbOutBuffer; | size of output buffer |
| LPULONG | IpcbBytesReturned; | address of actual bytes of output |
| LPOVERLAPPED | IpoOverlapped; | address of overlapped structure |

The parameter hDevice of type HANDLE serves to identify the device with an identifier termed a handle. A Create File function returns the value of the parameter. The parameter UIIoControlCode of type ULONG specifies the control code for a particular operation. In particular, this value identifies the specific operation to be performed and the type of device on which the operation is to be performed. In accordance with the present invention, the following values have been defined:

| CPQRS_GET_VERSION | 00000001h | Fetches version and revision of driver |
|---|---|---|
| CPQRS_READ_ROM_IMAGE | 00000002h | Reads specific number of bytes from ROM |
| CPQRS_FLASH_ROM | 00000003h | Flashes the ROM |
| CPQRS_GET_ROM_IMAGE_SIZE | 00000004h | Returns the size of the ROM |
| CPQRS_GET_SECURITY_FEATURES | 00000005h | Returns the remote security capabilities implemented on system |
| CPQRS_SET_SECURITY_FEATURES | 00000006h | Sets the remote security capabilities of system |
| CPQRS_IS_ADMIN_PASSWORD_SET | 00000007h | Determines if administrator password is set on the target system |

The value 00000001h corresponds to the function CPQRS_GET_VERSION for fetching the version and revision of the driver 812. The value 00000002h corresponds to the function CPQUS_READ_ROM_IMAGE for reading a specified number of bytes from the ROM 78. The value 00000003h corresponds to the function CPQRS_FLASH_ROM for flashing the ROM 78. The value 00000004h corresponds to the function CPQRS_GET_ROM_IMAGE_SIZE for returning the size of the ROM 78. The value 00000005h corresponds to the function CPQRS-CET_SECURITY_FEATURES for returning the remote security capabilities that are implemented on the system S. The value 00000006h corresponds to the function CPQRS_SET_SECURITY_FEAUTURES for setting the remote security capabilities of the system S. Lastly, the value 00000007h corresponds to the function CPQRS_IS_ADMIN_PASSWORD_SET for determining if the administrator password is set on the target computer system S.

The IpvInBuffer parameter of type LPVOID points to a buffer containing the data required to perform the operation. The parameter may be set to null if the UIIoControlCode parameter specifies an operation that does not require input data. The cbInBuffer parameter of type ULONG specifies the size, in bytes, of the IpvInBuffer buffer. The pvOutBuffer parameter of type LPVOID points to a buffer in which the output data of the operation is returned. This parameter may be null if the uIIoControlCode parameter specifies an operation that does not require output data. The cbOutbuffer parameter of type ULONG specifies the size, in bytes, of the IpvOutBuffer buffer. The IpcbBytesReturned parameter of type LPULONG points to a 32-bit variable that receives the size, in bytes, of the data returned in the IpvOutBuffer buffer. Lastly, the IpoOverlapped parameter of type LPOVERLAPED points to an overlapped or a synchronous structure.

In accordance with the present invention, various functions may be defined for use with the DeviceIoControl API. The function Read ROM Image allows the remote management application 801 to read a specified number of bytes from the ROM 78. For example, the application 801 may obtain the ROM family code/version information of the ROM 78 by requesting to read a specific number of bytes at a memory location containing the information. The input parameter values to DeviceIoControl for this function are given below:

| HDevice | Handle returned for CreateFile function |
|---|---|
| UIIoControlCode | CPQRS_READ_ROM_IMAGE (00000002h) |
| IpvInBuffer | Pointer to ReadImageParams or NULL |
| CbInBuffer | SIZEOF ReadImageParms |
| LpvOutBuffer | Pointer to ReadImageParams |
| CbOutBufer | SIZEOF ReadImageParams |
| LpcbBytesReturned | Pointer to ULONG for number of bytes returned |
| IpoOverlapped | NULL |

For the Read ROM Image function, the UIIoControlCode parameter is set to 00000002h. corresponding to the CPQRS_READ_ROM_IMAGE function. Therefore, the function CPQRS_READ_ROM_IMAGE is the specific operation to be performed when the Read ROM Image function is called. The data passed to the Read ROM function is contained in the structure defined below:

```
typedef struct READIMAGEPARAMS_s
{
BYTE              bReturnCode;
DWORD             dwLength;
PBYPTe            pBuffer;
DWORD             dwOffset
}READIMAGEPARAMS, *PREADIMAGEPARAMS,
 *LPREADIMAGEPARAMS;
```

The variable bReturnCode returns the function return code. If the function is successful, the word ASUCCESS≅ is returned. The variable dwLength corresponds to the length of the output buffer which is the number of bytes to read. This variable is updated with the number of bytes read out of the ROM 78 by the driver 812. The variable pBuffer is a pointer to an array of bytes to store the ROM image bytes. Lastly, the variable dwOffset is the starting offset in the ROM image to read.

Next, the function Flash ROM transmits the ROM image to be flashed to the ROM 78. The input parameters to DeviceIoControl for this function are below:

| Hdevice | Handle returned from CreateFile function |
|---|---|
| UIIoControlCode | CPQRS_FLASH_ROM (00000003h) |
| IpvInBuffer | Pointer to FlashRomParms or NULL |
| CbInBuffer | SIZEOF Flash RomParams |
| LpvOutBuffer | Pointer to FlashRomParams |
| CbOutBuffer | SIZEOF FlashRomParams |

-continued

| | |
|---|---|
| LpcbByesReturned | Pointer to DWORD for number of bytes returned |
| IpoOverlapped | NULL |

For the Flash ROM function, the UIIoControlCode parameter is set to 00000003h corresponding to the CPQRS_FLASH_ROM function. Therefore, the function CPQRS_FLASH_ROM is the specific operation to be performed when the Flash ROM function is called. The data passed to the Flash ROM function is contained in the structure defined below:.

```
typedef struct FLASHROMPARAMS_s
    {
    BYTE                bReturnCode;
    PBYTE               pImage;
    DWORD               dwImageSize;
    PBYTE               pAdminPassword;
    } FLASHROMPARAMS, *PFLASHROMPARAMS,
    *LPFLASHROMPARAMS;
```

The parameter bReturnCode of type BYTE is the return code for the function. The parameter pImage of type PBYTE contains a pointer to a buffer containing the ROM image that is to be flashed to the system ROM 78. The parameter dwImageSize of type DWORD identifies the number of bytes in the ROM image buffer. The number of bytes in the ROM image buffer indicates the size of the ROM image. The pAdminPassword parameter of type PBYTE is a pointer to a null-terminated array of scan code bytes representing the administrator password.

Another function defined in accordance with the present invention is the Get ROM Size function. The input parameters to DeviceIoControl for this function are below:

| | |
|---|---|
| Hdevice | Handle returned from CreateFile function |
| UIIoControlCode | CPQRS_GET_ROM_SIZE (00000004h) |
| IpvInBuffer | Pointer to GetRomSizeParams or NULL |
| CbInBuffer | SIZEOF GetRomSizeParams |
| LpvOutBuffer | Pointer to GetRomSizeParams |
| CbOutBuffer | SIZEOF GetRomSizeParams |
| LpcbBytesReturned | Pointer to DWORD for number of bytes returned |
| IpoOverlapped | NULL |

For the Get ROM Size function, the UIIoControlCode parameter is set to 00000004h corresponding to the CPQRS_GET_ROM_SIZE function. Therefore, the function CPQRS_GET_ROM_SIZE is the specific operation to be performed when the Get ROM Size function is called. The data passed to the Get ROM Size function is contained in the structure defined below:

```
typedef struct GETROMSIZEPARAMS_s
    {
    BYTE                bReturnCode;
    DWORD               dwRomSize;
    } GETROMSIZEPARAMS, *PGETROMSIZEPARAMS,
    *LPGETROMSIZE[001b]-PARAMS;
```

The variable bReturnCode is the return code for the function. The variable dwRomSize identifies the size in bytes of the ROM 78.

The function Is Administrator Password Set is used for both a remote flash and remote security administration. The function returns a flag to indicate if the administrator password is. set on a target computer system S. The input parameters to DeviceIoControl for this function are provided below:

| | |
|---|---|
| hDevice | Handle returned from CreateFile function |
| UIIoControlCode | CPQRS_IS_ADMIN_PASSWORD_SET (00000007h) |
| IpvInBuffer | Pointer to IsAdminSetParams or NULL |
| cbInBuffer | SIZEOF IsAdminSetParams |
| LpvOutBuffer | Pointer to IsAdminSetParams |
| cbOutBuffer | SIZEOF IsAdminSetParams |
| LpcbBytesReturned | Pointer to DWORD for number of bytes returned |
| IpoOverlapped | NULL |

For the Is Administrator Password Set function, the UIIoControlCode parameter is set to 00000007h corresponding to tile CPQRS_IS_ADMIN_PASSWORD_SET function. Therefore, the function CPQRS_IS_ADMIN_PASSWORD_SET is the specific operation to be performed when the Is Administrator Password Set function is called. The parameter block passed to the function is contained in the structure defined below:

```
typedef struct ISADMINSETPARAMS_s
    {
    BYTE                bReturnCode;
    BOOL                fPasswordIsSet;
    } ISADMINSETPARAMS, *PISADMINSETPARAMS,
    *LPISADMINSETPARARAMS;
```

The parameter bReturnCode is the return code for the function. The parameter fPasswordIsSet is a flag to indicate whether the administrator password is set or not on the target systems. If the flag is true, the administrator password is set. If the flag is false, the administrator password is not set.

Other functions are defined for remote security administration in accordance with the present invention. These functions include the Get Security Features function and the Set Security Features function. The input parameters to DeviceIoControl for the Get Security Features function are provided below:

| | |
|---|---|
| Hdevice | Handle returned from CreateFile function |
| UIIoControlCode | CPQRS_GET_SECURITY_FEATURES (00000005h) |
| IpvInBuffer | Pointer to GetSecurityFeaturesParams or NULL |
| CbInBuffer | SIZE OF GetSecurityFeaturesParams |
| LpvOutBuffer | Pointer to GetSecurityFeaturesParams |
| CbOutBuffer | SIZEOF GetSecurityFeaturesParams |
| LpcbBytesReturned | Pointer to DWORD for number of bytes returned |
| IpoOverlapped | NULL |

For the Get Security Features function, the UIIoControlCode parameter is set to 00000005h corresponding to the CPQRS_GET_SECURITY_FEATURES function. Therefore, the CPQRS_GET_SECURITY_FEATURES function is the specific operation to be performed where the Get Security Features function is called. The data passed to the function is contained in the structure defined below:

```
typedef struct GETSECURITYFEATURESPARAMS_s
{
    BYTE                bReturnCode;
    PBYTE               pBuffer;
    DWORD               dwBufferSize;
} GETSECURITYFEATURESPARAMS,
*PGETSECURITYFEATURESPARAMS,
*LPGETSECURITYFEATURESPARARMS;
```

The parameter bReturnCode is the return code for te function. The parameter pBuffer contains a pointer to a buffer to store the list of security features. The application 801 can determine the size of the buffer it needs to allocate by setting the dwBufferSize field to zero and making this call. The parameter dwBufferSize identifies the size in bytes in the buffer. If this field is zero, the driver 812 calls the BIOS services requesting the total size in bytes of the security features list. The application 801 thereby is aware of how much memory to allocate before executing a call to fetch the security features.

The input parameters to DeviceIoControl for the Set Security Features function are provided below:

| | |
|---|---|
| Hdevice | Handle returned from CreateFile function |
| UIIoControlCode | CPQRS_SET_SECURITY_FEATURES (00000006h) |
| lpvInBuffer | Pointer to SetSecurityFeaturesParams |
| CbInBuffer | SIZE OF SetSecurityFeaturesParams |
| LpvOutBuffer | Pointer to SetSecurityFeaturesParams |
| CbOutBuffer | SIZEOF SetSecurityFeaturesParams |
| LpcbBytesReturned | Pointer to DWORD for number of bytes returned |
| lpoOverlapped | NULL |

For the Set Security Features function, the UIIoControlCode parameter is set to 00000006h corresponding to the CPQRS_SET_SECURITY_FEATURES function. Therefore, the CPQRS_SET_SECURITY_FEATURES function is the specific operation to be performed when the Set Security Features function is called. The parameter block passed to the function is contained in the structure defined below:

```
typedef struct SETSECURITYFEATURESPARAMS_s
{
    BYTE                bReturnCode;
    PBYTE               pBuffer;
    DWORD               dwBufferSize;
} SETSECURITYFEATURESPARAMS,
*PSETSECURITYFEATURESPARMS,
*LPSETSECURITYFEATURESPARAMS;
```

The bReturnCode parameter is the return code for the function. The pBuffer parameter contains a pointer to a buffer that contains a list of security features to set on the computer system S. The parameter dwBufferSize specifies the size of the buffer.

The error codes to which the function return codes for the above defined functions may be mapped are provided in the table below. For each return code, the table includes the return code identifier, the return code value, and the description for the return code:

| | | |
|---|---|---|
| SUCCESS | 00h | The function was successful |
| INVALID_PASSWORD | 80h | The administrator password submitted to unlock the ROM does not match the password set on the target system |
| PASSWORD_NOT_PROVIDED | 81h | No administrator password was provided |
| ROM_NOT_PROVIDED | 82h | No administrator password is set on the target system |
| INVALID_SECURITY_TAG_VALUE | 83h | Invalid request vector in the input buffer for set security feature |
| INVALID_SECURITY_TAG_LEN | 84h | The length element fora request vector is invalid |
| INVALID_BUFFER_SIZE | 85h | The specified buffer length is invalid |
| SECURITY_SET_NOT_ALLOWED | 87h | Could not set a security feature |
| SECURITY_VAL_REMOVE_NOT_ALLOWED | 88h | Could not remove setting for a security feature |
| FLASH_FAILED | F0h | The driver could not flash the system ROM |
| INVALID_IOCTL_PARAMETER | F1h | Invalid parameter in the DeviceIoControl parameters |
| DEVICEIO_BUSY | F2h | The driver is busy and cannot complete the requested IOCTL |
| FUNCTION_NOT_SUPPORTED | F3h | The IOCTL is not supported by the driver |
| FUNCTION_IN_PROGRESS | F4h | Flash in progress by another process |
| INVALID_ROM_IMAGE | F5h | The family code of the ROM image transmitted does match the current ROM |
| ERROR_LOCKING_MEMORY | F6h | Could not page lock buffer |

Remote Management Process

Referring to FIGS. 12A–12D, the remote management process according to the present invention is shown. Beginning at step 900, the SDA installation scripts of the remote management package 600 are invoked. Invoking the installation scripts automatically executes the remote management control 806. Next, in step 902, a local universal resource locator (URL) is extracted from tile remote management package 600. Control then proceeds to step 904 in which the URL is used to locate the ROM image file 802. Although the disclosed embodiment uses a local URL (e.g. the name of the image to flash and/or security settings file), a URL may point to any "network accessible" image. An image is "network accessible" if the image is accessible via a Universal Naming Convention (UNC) path or an internet address. From step 904, control proceeds to step 906 where the administrator password is decrypted with a public key. Control next passes to step 908 where it is determined if the administrator password from the remote management package 600 is valid. If the administrator password is valid, control proceeds from step 908 to step 916 where an administrator mode is entered. Control next proceeds to step 918 where it is determined if the driver 812 is available. If the driver 812 is not available, control passes to step 924 where a return code for an absent driver is generated. If a driver 812 is available, control proceeds to step 920 where it is determined if the ROM image of the remote management package 600 is authentic.

Figure 13:
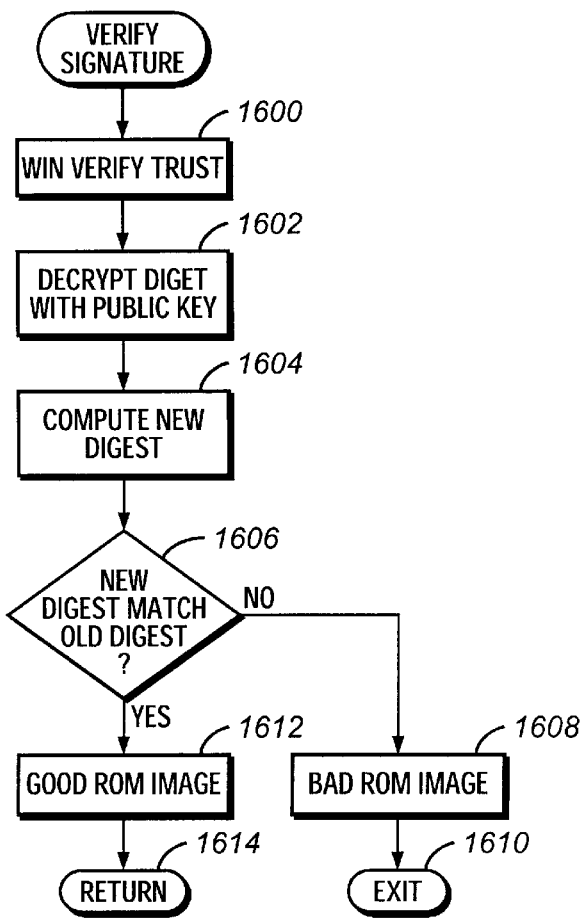
FIG. 13 is a flow chart of the verification and decryption process for a ROM image in accordance with the present invention.

Referring to FIG. 13, the verification and decryption process of the ROM image in step 920 is shown. Beginning in step 600, a verification function such as the Win Verify Trust ( ) function available from Microsoft Corporation is performed. The Win Verify Trust function performs a specified verification action on a specified subject. The function uses a HWND parameter, Action ID parameter, and an ActionData parameter. The HWND parameter which is a handle to a caller's window is used to determine whether a trust provider may interact with a user. If HWND is equal to INVALID_HANDLE_VALUE, there is not an interactive user. The trust provider therefore provides a verification operation without a user's assistance. If HWND is equal to 0, the trust provider may use the interactive desktop of the computer system S to display a user interface. If HWND is equal to any value other Mart INVALID_HANDLE_VALUE or 0, the trust provider has a valid window handle that the trust provider can use to interact with the user.

Action ID is a pointer that identifies an action in the trust provider that support the action identifier. Action ID indicates the type of verification action to perform when the subject identified by the ActionData parameter. Each bust provider provides its own unique set of action identifiers. Information about the action identifiers supported by a specific trust provider may be obtained from Microsoft Corporation. The ActionData parameter is a pointer to a buffer and contains information that the trust provider needs to process the specified action identifier. Typically, the data in the buffer includes information that identifies the subject that the trust provider must evaluate. The format of the data depends on the action identifier. Information bout the data required for a specific action identifier may also be obtained from Microsoft Corporation. The ActionData parameter which points to an action-specific data buffer associated with the trust provider specifies that the ROM image is executable and also specifies the name of the ROM image file.

Further, the trust provider provides a return value indicating the result of the verification operation. If the trust provider verifies that the subject is trusted for the specified action, the return value is ERROR_SUCCESS. Otherwise, the return value is the status code returned by the trust provider. A status code may indicate that a subject is not trusted or that a subject is trusted with certain limitations. A return value may be specific to a trust provider or may be a general error code. A trust provider presently supports four types of general error codes. The TRUST_E_SUBJECT_NOT_TRUSTED error code value indicates that a subject has failed the specified verification action. The TRUST_E_PROVIDER_UNKNOWN error code value indicates that the trust provider is not recognized in the system. The TRUST_E_ACTON_UNKNOWN indicates that the trust provider does not support the specified action. The TRUST_E_SUBJECT_FORM_UNKNOWN error code value indicates that a trust provider does not support the form specified for the subject.

From step 1600, control proceeds to step 1602 where the digest is decrypted with a public key. Next, in step 1604, a new digest is computed. Control then proceeds to step 1606 where it is determined if the new digest matches the old digest. If there is not a match, control proceeds to step 1608 where a bad ROM image return value is provided. From step 1618, control exits through step 1610. If there is a match, control proceeds to step 1602 where a good ROM image return value is provided. From step 1612, control returns Trough step 1614.

Returning to FIG. 12A, if the ROM image is not authentic, control proceeds to step 926 where a return value for a corrupt ROM image is generated. If the ROM image is authentic, control proceeds to step 922 (FIG. 12B) where it is determined if the remote management package 600 includes the correct ROM image and correct ROM family code. The checksum appended to the ROM image is checked to verify that the ROM image is correct. If either the ROM image or the ROM family code is incorrect, control proceeds to step 928 where a return code value corresponding to the respective error is generated. For example, if an incorrect ROM family code is detected, the return code value is INVALID-ROM-IMAGE. From steps, 924, 926, and 928, control proceeds to step 930 where the particular error is logged. From step 930, control exits through step 931.

If the ROM image and ROM family code are correct, control proceeds from step 922 to step 932, where it is determined if the user selected the remote ROM option or the remote security administration option. If it is determined that the remote ROM option was selected, control proceeds to step 946 where thf flash ROM 78 is preferably unlocked and the flash ROM programming is enabled. The remote management process enables flash ROM programming through a tri-modal INT15H function, INT15 (AX=0E822H, BL=01H). This function provides an interface between the remote management software package 600 according to the present invention and the flash ROM 78. The entry variables for the function include an entry register variable AX set to 0E822H, an entry register variable BL set to 01H, an entry register variable BH set to 098H, an entry register variable CS set to 07654H, and an entry register variable DX set to 03210H. If the enabling of flash ROM programming is successful, then the carry flag CF. is set equal to 0, the output variable AH is set to 00, and a flash in progress ROM bit is set to 00 indicating that a flash is in progress or that the flash may be corrupt. If the carry flag CF is equal to 0, then the attempt to enable the flash ROM programming failed.

Figure 16:
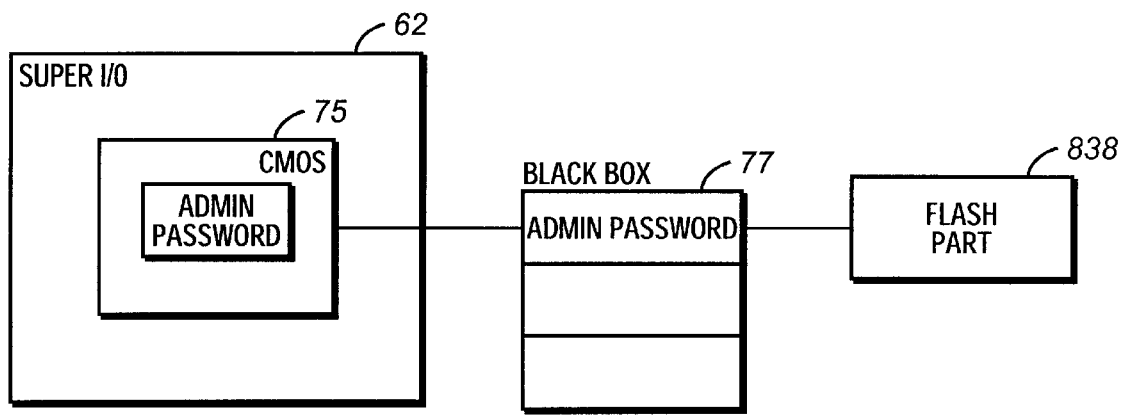
FIG. 16 is a schematic diagram of the computer system of FIG. 1 having a secure memory device in accordance with the remote management process of FIGS. 12A–12D.

Referring to FIG. 16, the computer system S of the present invention preferably includes a secure memory device, or "black box" 77 for locking and unlocking the flash part 838 of the system ROM 78. The administrator password is stored in both a non-volatile memory 75 such as a CMOS memory 75 and the "black box" 77. If an administrator password is provided to the "black box" 77, the "black box" 77 unlocks the flash part 838 of the system ROM 78. In accordance with the present invention, the "black box" unlocks the flash part 838 "on the fly" if an administrator password is included in the remote management package 600 downloaded to the ROM 78. A cold boot to trigger a cold power cycle is not needed to unlock the flash part 838. For a computer system S which does not include the "black box" 77, pseudo "black box" functionality may be achieved by using the ROM 78 to lock and unlock itself responsive to an administrator password. The use of a secure memory device to lock and unlock a flash is further described in the commonly-assigned U.S. patent application, entitled "METHOD AND APPARATUS FOR PROVIDING REMOTE ACCESS TO SECURITY FEATURES ON A, COMPUTER NETWORK" and the commonly-assigned U.S. patent application Ser. No. 08/396, 343, entitled "SECURITY CONTROL FOR PERSONAL COMPUTER," filed on Mar. 3, 1995, both previously incorporated by reference.

Returning to FIG. 12B, from step 946, control proceeds to step 948 where the power button mode disable is set. A power button mode disable is performed by calling the INT15h function, INT15 (AX=0E822H, BL=09H). This tri-modal function transitions the power button of the computer system S to a disabled state. By placing the power button of the computer system S in a disabled state, a user is prevented from inadvertently powering the computer system S during a flash of the system ROM 78. For this function, the entry register variable AX is set to 0E822H and entry register variable BL is set to 09H. If the function is successfully performed, the carry flag CF is set to 0 and AH is set to 00. If the function is not successful, the carry flag CF is set to 1. In unlocking the flash ROM 78, the appropriate bits are set and cleared to allow for programming of the flash ROM 78.

From step 948, control proceeds to step 950 where the computer system S exits the flash security on mode and enters the flash security off mode. For this function, the entry register variable AX is set to 0E822H, and entry register variable BL is set to 06H. Also, there is an entry variable DS:(E)SI which represents a pointer to a buffer containing a string representing the administrative password in SCAN code format. If there is a match between the password provided by the remote management package 600 and the administrator password on the computer system S, then the carry flag CF returns a 0 indicating a match. If the carry flag CF is equal to 0, the AH register variable returns 00. If there is not a match between the password provided in the remote management package 600 and the administrator password on the computer system S, then the carry flag CF is equal to 1 indicating a mismatch. In this case, the flash ROM 78 is still locked and the AH register variable returns an error code. If the remote management package 600 includes an incorrect password, AH returns the value 80H. If the required password is not provided, AH returns the value 811H. If the administrator password was not set on the target computer system S, AH returns an 82H value. If the specific call is not supported, AH returns the value 86H.

Next, control proceeds to step 952 where the flash in progress CMOS bit is set. It should be understood that the flash in progress CMOS bit is different from the flash in progress ROM bit previously mentioned. Setting the flash in progress CMOS bit is performed by calling the INT15h function, INT15 (AX=0E822H, BL=04H). The flash in progress CMOS bit identifies the current state of the ROM image 802 in the flash ROM 78. For this function, entry register variable AX is equal to 0E822H and entry variable BL is equal to 04H. If the flash in progress CMOS bit is successfully set, the carry flag CF is set equal to 0 and AH is set equal to 00. If the flash in progress CMOS bit is not successfully set, the carry flag CF is set equal to 1 and AH returns an error code.

From step 952, control proceeds to step 954 where the flash ROM 78 is flashed using a system management interrupt (SMI). The flash is performed by calling a tri-modal INT15h function, INT15 (AX=0E822H, BL=0AH). The SMI handler routine initially locates a header containing parameters that define a flash operation. Parameters of the header include ID_STRING, IMAGE_ADDR, IMAGE_OFF, IMAGE-LEN, COMMAND, RESULT,
PASSWORD, MSG_DIGEST_0, MSG_DIGEST_1, MSG_DIGEST_2 and MSG_DIGEST_3. ID_STRING is used by the SMI code to locate the header. ID_STRING is set to "ROM IMAGE." IMAGE_ADDR is the flat thirty-two bit address of the buffer to be flashed to the flash ROM 78. The buffer is contiguous in physical memory. IMAGE_OFF is the offset into the ROM 78 that is to be flashed with the ROM image. The offset allows for iterative flashing such that only a portion of the image is called with the function until the entire ROM 78 is flashed,. This iterative flashing occurs from lowest to highest address in contiguous blocks. IMAGE_LEN refers to the lengths, in bytes, of the current image buffer. COMMAND refers to the requested operation. If COMMAND is equal to 0, the requested operation is to return the ID data for the ROM image. If COMMAND is equal to 1, the requested operation is also to return ID data for the ROM image. If COMMAND is equal to 2, the requested operation is a read of the IMAGE-LEN bytes of the ROM into the image buffer. If COMMAND is equal to 3, the requested operation is to flash the IMAGE-LEN bytes of the image buffer to the ROM.

The RESULT parameter is equal to 0 if the requested operation is successful. If the requested operation is not successful, RESULT is equal to a non-zero value. PASSWORD is an eight byte administrator password if an administrator password is set on the computer system S. If an administrator password is not set on the computer system S, PASSWORD is equal to a null value. The MSG_DIGEST variables refer to a message digest of the buffer. The message digest is preferably at least a 128-bit hash code. Flashing a ROM using a tri-modal INT 15h function and SMI code is further described in commonly-assigned U.S. patent application entitled "METHOD AND APPARATUS FOR FLASHING ESCD AND VARIABLES INTO A ROM," previously incorporated herein by reference, and commonly-assigned U.S. patent application entitled "METHOD OF FLASHING AND READING A ROM OF A COMPUTER SYSTEM INDEPENDENTLY OF ITS OPERATING SYSTEM," previously incorporated herein by reference.

Figure 14:
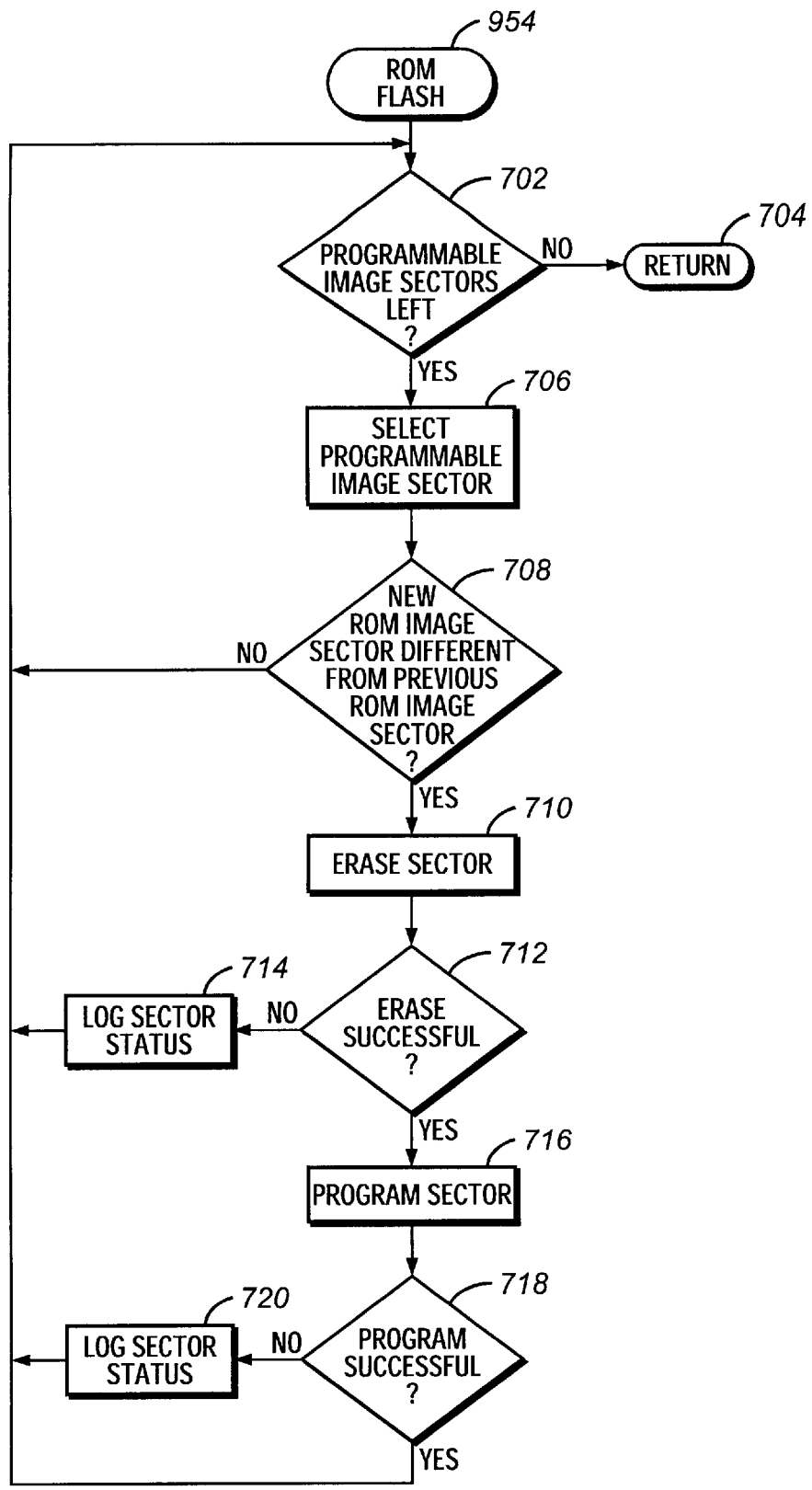
FIG. 14 is a flow chart of the process for flashing a ROM in accordance with the remote management process of FIGS. 12A–12D.

Referring to FIG. 14, the process of step 954 for flashing the flash part 838 of the ROM 78 is shown. Beginning in step 702, it is determined if any programmable image sectors are left. If no sectors are left, then control return through step 704. If there are programmable image sectors left, then control proceeds to step 706 where a programmable image sector is selected. Next, in step 708 it is determined whether the new ROM image sector is different from the previous ROM image sector. If there is no difference between the two sectors, then control returns to step 702. If the new ROM image sector is different from the previous ROM sector, then control proceeds to step 710 where the ROM image sector is erased. Control then proceeds to step 712 where it is determined if the erase of the sector is successful. If the erase is not successful, control proceeds to step 714 where the sector status is logged. From step 714, control returns to step 702. If the erase of the sector is successful, control proceeds from step 712 to step 716 where the ROM image sector is programmed. From step 716, control passes to step 718 where it is determined if programming of the sector is successful. If programming of the sector is not successful, control proceeds to step 720 where the sector status of logged. From step 720, control returns to step 702. If programming of the sector is successful, control proceeds from step 718 to step 702 where the determination is again made as to whether any programmable image sectors are left. The process continues to loop back to step 702 until all image sectors are programmed.

Figure 12A:
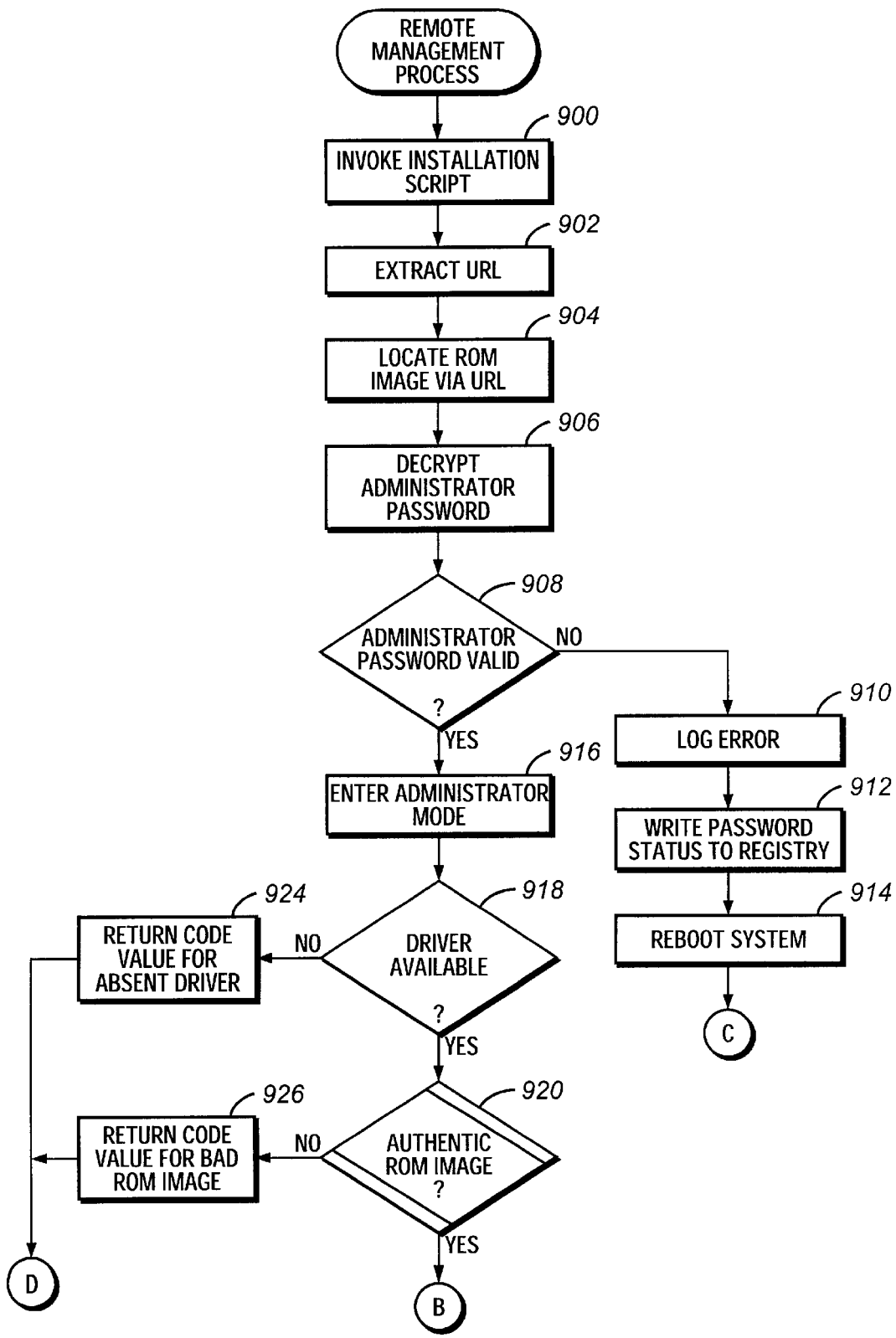
FIGS. 12A–12D are flow charts of the remote management process according to the present invention.
Figure 12B:
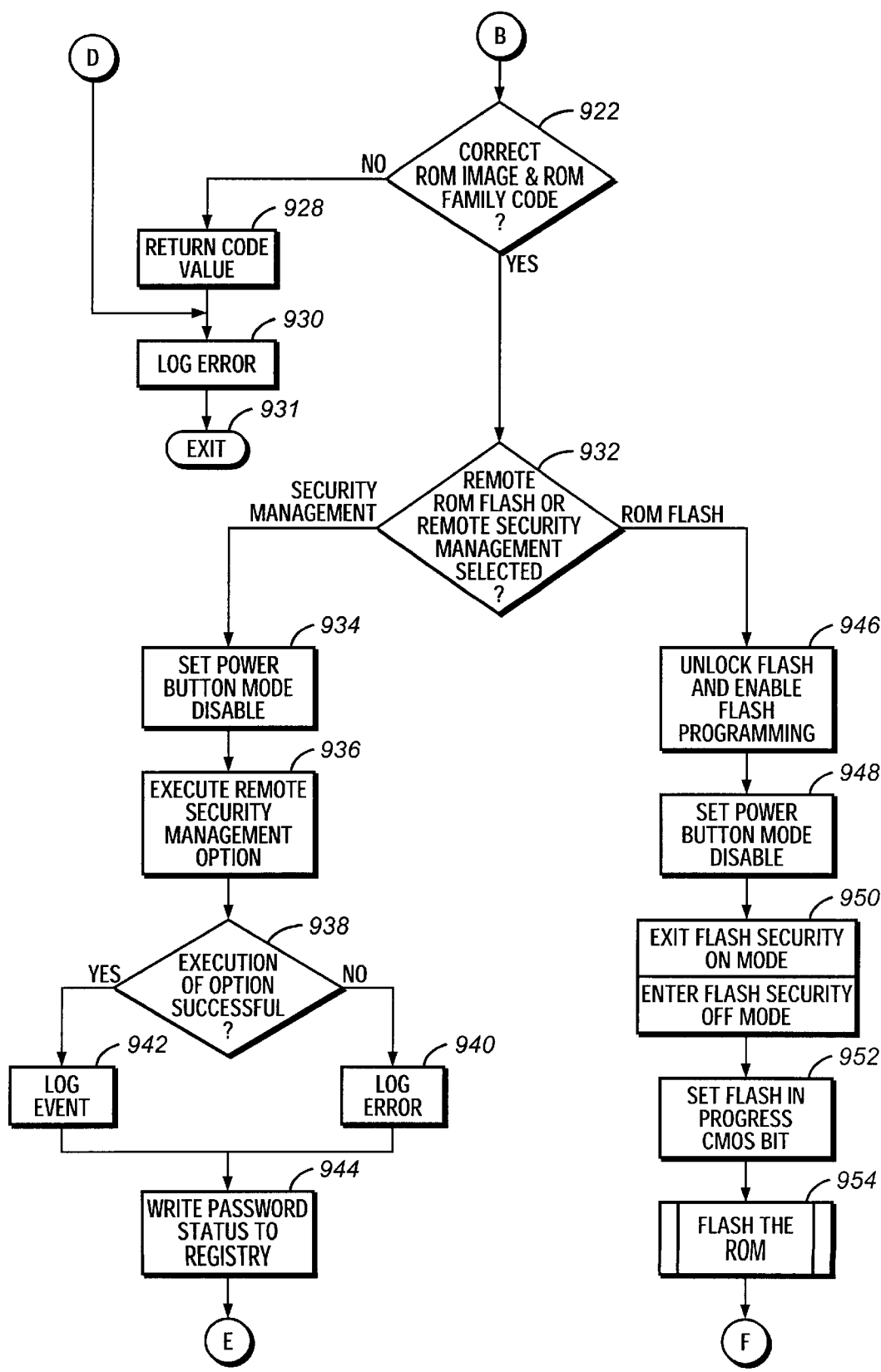
Figure 12C:
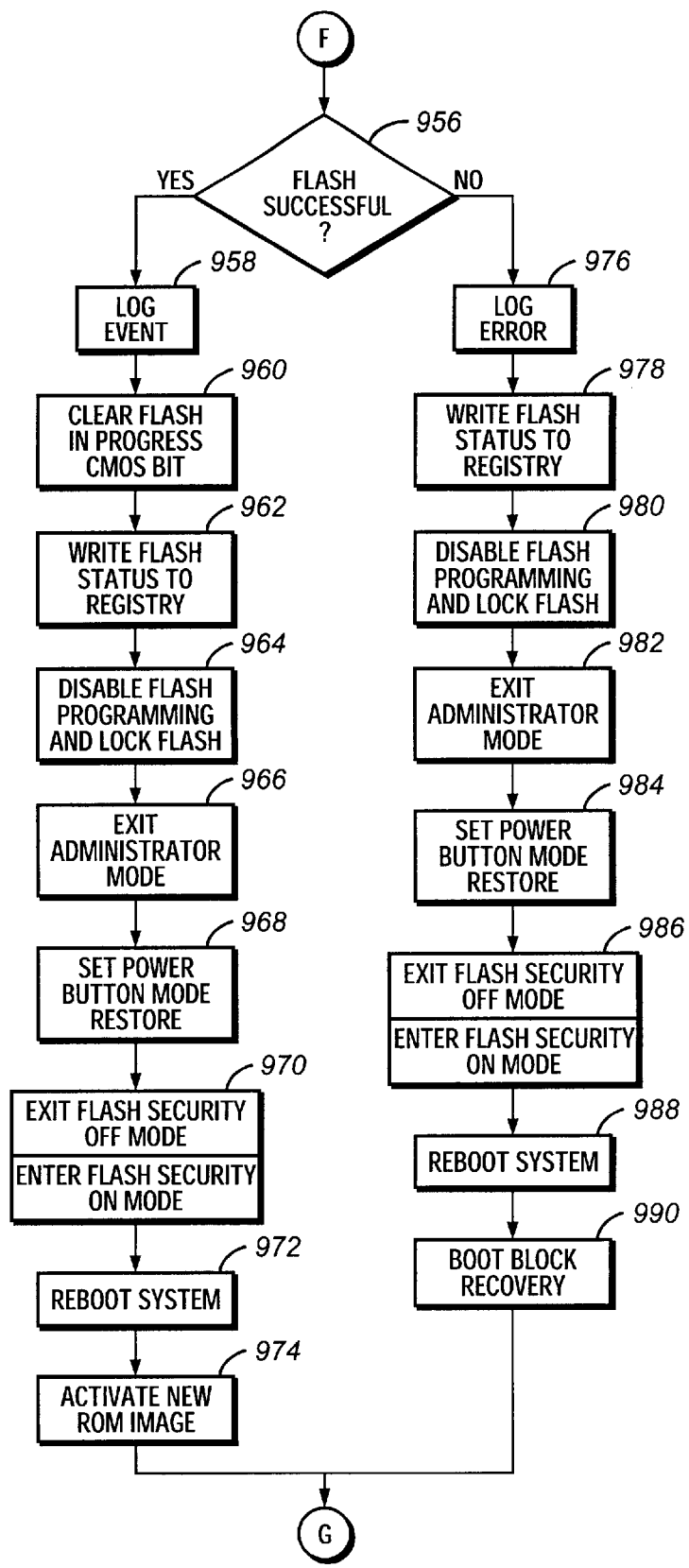

Returning to FIG. 12B, from step 954, control proceeds to step 956 where it is determined if the flash of the ROM 78 is successful (FIG. 12C). If the flash is successful, control proceeds to step 958 where the event is logged. From step 958, control passes to step 960 where the flash in progress CMOS bit is cleared. The clearing of the flash CMOS bit is performed by calling an INT15h function, INT15 AX=E822H BL=05H. For this function, the entry variable AX is equal to E822H and entry variable BL is equal to 05H. If the flash in progress CMOS bit is successfully cleared, the carry flag CF is equal to 0 and AH returns a 00H. If the flash in progress CMOS bit is not successfully cleared, then the carry flag CF returns a 1 and AH returns an error code. From step 960, control proceeds to step 962 where the flash status is written to the registry.

Next, in step 964, flash programming is disabled and the flash ROM 78 is preferably, locked. Flash programming is disabled by calling an INT15h tri-modal function, INT15

(AX=0E822H, BL=05H). This function provides interface between the remote management package 600 and the flash part 838 of the flash ROM 78. For this function, entry register variable-AX is set equal to 0E822H, entry register variable BL is equal to 05H, entry security value BX is set equal to 98H, entry security value CX is set equal to 7654H, and entry security value DX is set equal to 3210H. If the flash programming is successfully disabled, the carry flag CF returns a 0 and AH returns a 00. If the flash programming is not successfully disabled, the carry flag CF returns a 1 and AH returns an error code.

Next, control proceeds to step 966 where the computer system S exits the administrator mode. From step 966, control proceeds to step 968 where the power button mode restore is set. The power button mode restore is set by calling an INT15h tri-modal function, INT15 (AX=0E822H, BL=09H). This function returns the power button to its original power state. For this function, the entry register variable AX is equal to 0E822H and entry register variable BL is equal to 09H. If the power button mode restore is successfully performed, the carry flag CF returns a 0 and AH returns a 00. If restoration of the power button mode is not successful, the carry flag CF returns a 1. From step 968, control proceeds to step 970 where the flash security off mode is exited and the flash security on mode is entered. The function for performing the transition between the flash security off mode and the flash security on mode is a flash security on INT15h function, INT15 (AX=0E822H, BL=07H). The function uses a pointer to a string representing the administrator password provided by the remote management package 600. The string is, compared to the current value stored on the target system S for the administrator password. If there is a match, the carry flag CF returns a 0 and AH is equal to 00. If there is not a match, the carry flag CF is set to 1 and AH is set to an error code. An error code of 80H indicates an incorrect password. An error code of 81H indicates that the required password is not provided. An error code of 82H indicates that the administrator password is not set on the target system. An error code of 86H indicates that the particular call is not supported by the computer system.

Further, for this function, entry register variable BL is set to 07H, and DS:(E)SI is a pointer to a buffer containing a string representing the administrator password. From step 970, control proceeds to step 972 where the computer system S is rebooted. Upon reboot, the new ROM image is activated as indicated in step 974.

If a flash is not successful in step 956, control instead proceeds to step 976 where the error is logged. Control then passes to step 978 where the flash status is written to the registry of the computer system S. From step 978, control proceeds to step 980 where flash programming is disabled and the flash ROM 78 is preferably locked. The flash ROM 78 is disabled using an INT15h tri-modal function as described above. The flash ROM 78 may be locked using the security memory device containing an administrator password described above. From step 980, control proceeds to step 982 where the computer system S exits the administrator mode. From step 982, control proceeds to step 984 where the power button mode restore is set. The power button mode restore is set using a tri-modal INT15h function as described above.

Figure 12D:
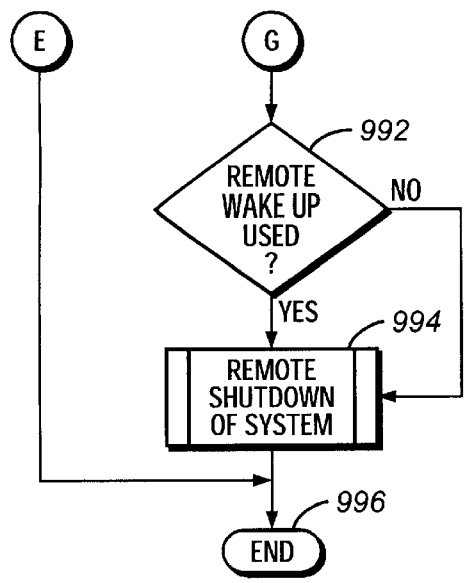

Next, control proceeds to step 986 where the computer system S transitions from a flash I) security off mode to a flash security on mode. This transition is achieved by calling a flash on INT15h function as described above. From step 986, control proceeds to step 988 where the computer system S is rebooted. Next, in step 990, the computer system S performs a boot block recovery by executing boot block code which provides recovery from a failed flash. Boot block. recovery typically includes flashing a valid ROM image using a diskette. Further details relating to boot recovery are described in commonly-assigned U.S. patent application, entitled "METHOD AND APPARATUS FOR USING AN ADMINISTRATOR PASSWORD TO FLASH A CORRUPTED ROM IMAGE," and commonly-assigned U.S. patent application entitled "METHOD AND APPARATUS TO FORCE A COMPUTER SYSTEM INTO BOOT BLOCK RECOVERY," previously incorporated by reference. The computer system S detects that a boot block recovery is to be performed because the flash in progress CMOS bit is still set. From steps 974 and 990, control proceeds to step 992 where it is detected if a remote wake-up was used (FIGS. 12C–12D). If a remote wake-up was used, control proceeds to step 994 where a remote shutdown of the computer system S is performed.

Figure 15:
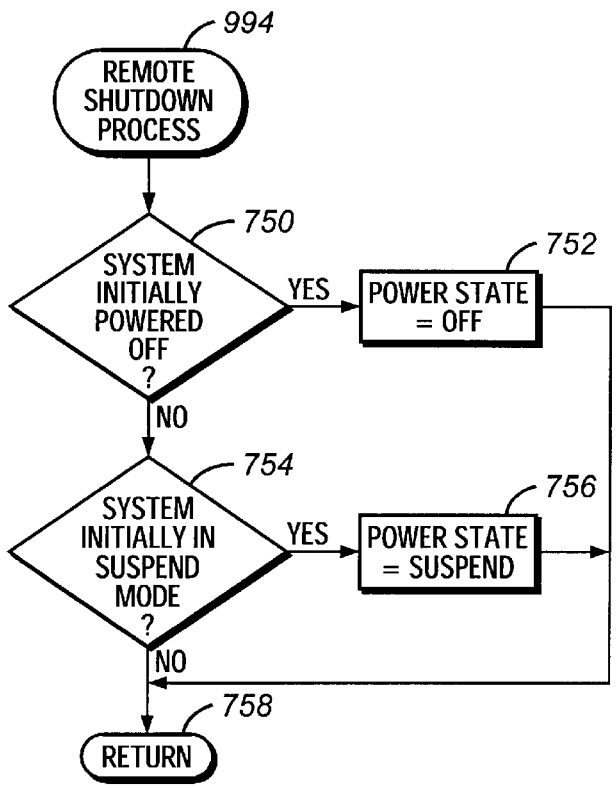
FIG. 15 is a flow chart of the remote shutdown process according to the present invention in accordance with the remote management process of FIGS. 12A–12D.

Referring to FIG. 15, the remote shutdown process of step 994 is shown. Beginning at step 750, it is determined if the computer system S was initially powered off. If the computer system S was initially powered off, control proceeds to step 752 where the power state of the computer system is placed in an off state. If the system S was not initially powered off, control proceeds from step 750 to step 754. In step 754, it is determined if the system S was initially in a suspend power mode. If the system S was initially in a suspend power mode, control passes to step 756 where the power state of the computer system S is set for a suspend mode. It should be understood that there are various ways of placing the computer system in a off state or a suspend mode. For example, tie computer system S may be placed in the suspend mode using a tri-modal call issued by the operating system or by an advanced power management (APM) driver to BIOS services to initiate the change of the power state. Another alternative would be executing reset code in the CMOS memory 75 during POST to cause the computer system S to be powered off.

If it is determined in step 754 that the system S was not initially in the suspend mode, control terminates through step 758. If the computer system S was not powered off or in a suspend mode, the computer system S was either in a standby mode or a power on mode. In either case, it is not necessary to change the power state of the system S. From steps 752 and 756, control returns through step 758. Returning to FIG. 12D, from step 994, control proceeds to step 996 where the remote management process is terminated. If a remote wake-up is not used, control proceeds from step 992 to step 996 where the remote management process is terminated.

Thus, a system according to the present invention provides a remote flash ROM and security package 600 to be delivered to a system ROM 78 of a target computer system S for remote flashing of the system ROM 78 and remote configuration of security settings for the computer system S. The remote flash ROM and security package 600 includes flash ROM and security control code 806 for calling a remote flash and security driver 812 to selectively execute a remote flash and a remote security setting configuration, a file 802 containing a ROM image to be flashed to the system ROM, a security settings file 808 which preferably is encrypted, and a remote flash and security control container 800 for containing the flash ROM and security control code 806, the ROM image file 802, and the security settings file 808. The remote flash and security driver 812 may be included in the remote flash ROM and security package 600 or may be resident to the target computer system S. If the target computer system S includes a web browser which may serve as a remote flash and security control container, the remote flash ROM and security package 600 need not include a remote flash and security control container 800.

In the disclosed embodiment, the computer system S includes the secure memory device, or "black box," 77 containing an administrator password for locking and unlocking the flash part 838 of the system ROM 78. The "black box" 77 permits unlocking the flash part 838 without the need for a cold power cycle of the computer system S. The remote flash ROM and security package 600 may provide an administrator password matching the administrator password stored in the "black box" 77 to place the computer system S in an administrator mode. The administrator mode allows for unlocking the flash part 838 of the system ROM 78 and changing security settings for the computer system S. A system ROM 78 thereby may be flashed remotely without the need for a user to enter an administrator password. The ROM image to be flashed to the flash part 838 preferably includes a digital signature and certificate for authenticating the ROM image and a checksum for verifying the ROM image.

Flashing the ROM or changing a security setting in accordance with the present invention occurs as an "inband" process. Flashing a ROM or changing a security setting through an Ainband= process eliminates the need to download a flash ROM and security package to a system partition of a fixed disk of a computer system and also the need to reboot a computer system after downloading the package to flash the ROM or change a security setting. By eliminating the need to download a flash ROM and security package to a system partition of a fixed disk, more free memory space is available on the fixed disk. Further, by eliminating the need to reboot a computer system after downloading a flash ROM and security package, a ROM may be flashed interactively at runtime or a security setting may be changed interactively at runtime.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A remote method of flashing a non-volatile memory of a target computer system comprising the steps of:
packaging component object model-based remote flash control code for calling a remote flash driver to execute a remote flash of the non-volatile memory, a file containing an image to be flashed onto the non-volatile memory, and a remote flash control container for containing the component object model-based remote flash control code and the image file into a remote flash software package;
packaging an administrator password in the remote flash software package; and
delivering the remote flash software package to the target computer system.

2. The method of claim 1, further comprising the step of:
packaging the remote flash driver in the remote flash software package to be delivered to the target computer system.

3. The method of claim 1, the non-volatile memory having a flash enabled state for allowing a flash of the non-volatile memory and a flash disabled state for preventing a flash of the non-volatile memory and being in the flash disabled state, further comprising the steps of:
comparing the administrator password in the remote flash package to an administrator password stored in the target computer system; and
placing the non-volatile memory in a flash enabled state if the administrator password of the remote flash software package matches the administrator password in the target computer system.

4. The method of claim 1, the target computer system including a secure memory device storing an administrator password and controlling the locking and unlocking of the non-volatile memory, the non-volatile memory being in a locked state, comprising the step of:
unlocking the non-volatile memory by the secure memory device if the administrator password of the remote flash software package matches the administrator password stored in the secure memory device.

5. The method of claim 1, comprising the step of:
packaging an encrypted checksum of the image in the remote flash software package to be delivered to the target computer system.

6. The method of claim 1, further comprising the step of:
packaging software distribution application scripts in the remote flash software package to be delivered to the target computer system.

7. The method of claim 1, further comprising the step of:
remotely powering the target computer system before said step of delivering the remote flash software package.

8. The method of claim 1, further comprising the step of:
packaging a uniform resource locator pointing to the location of the file containing the image in the remote flash software package.

9. The method of claim 1, wherein the non-volatile memory is a flash read-only-memory.

10. The method of claim 1, wherein the remote flash control code is an OCX file.

11. The method of claim 1, wherein the component object model-based remote flash control code is an ActiveX control.

12. The method of claim 1, wherein the file containing the image to be flashed is an OCX file.

13. The method of claim 1, wherein the remote flash control container is an ActiveX control container.

14. The method of claim 1, comprising the step of:
signing the image to be packaged into the remote flash software package.

15. The method of claim 14, wherein the step of signing the image comprises the step of calling a cryptographic function.

16. The method of claim 14, further comprising the step of:
verifying the signature of the image delivered to the target computer system.

17. The method of claim 1, further comprising the steps of:
calling the remote flash driver by the component object model-based remote flash control code; and
executing a remote flash of the non-volatile memory by the remote flash driver.

18. The method of claim 17, the target computer system having the remote flash driver, further comprising the step of:
dynamically loading the remote flash driver to be called by the component object model-based remote flash control code.

19. The method of claim 17, further comprising the step of:
  remotely unpowering the target computer system after the step of executing a flash of the non-volatile memory.

20. The method of claim 17, the remote flash software package including an encrypted checksum, further comprising the steps of:
  decrypting the encrypted checksum after the step of delivering the remote flash software package;
  verifying the checksum; and
  executing a flash of the non-volatile memory if the checksum is valid.

21. The method of claim 17, the target computer system having a software distribution application agent, the remote flash software package including software distribution application scripts, further comprising the step of:
  invoking the step of executing a flash of the non-volatile memory as a system process.

22. The method of claim 17, wherein the flash of the non-volatile memory is an inband process.

23. The method of claim 17, the remote flash software package including a uniform resource locator pointing to the location of the file containing the image, further comprising the step of:
  locating the file containing the image using the uniform resource locator.

24. The method of claim 17, further comprising the step of:
  disabling a power button of the target computer system before the step of executing a flash of the non-volatile memory.

25. The method of claim 24, further comprising the step of:
  enabling a power button of the target computer system after the step of executing a flash of the non-volatile memory.

26. A remote method of configuring security settings of a target computer system, comprising the steps of:
  packaging component object model-based remote security control code for calling a remote security driver to execute a remote configuration of a security setting, a security settings file, and a remote security control container for containing the component object model-based remote security control code and the security settings file into a remote security software package;
  packaging an administrator password in the remote security software package; and
  delivering the remote security software package to the target computer system.

27. The method of claim 26, further comprising the step of:
  packaging the remote security driver in the remote security software package to be delivered to the target computer system.

28. The method of claim 26, the computer system including a non-volatile memory storing security settings, the non-volatile memory having a unlocked state for allowing access to the non-volatile memory and locked state for preventing access to the non-volatile memory, the non-volatile memory being in the locked state, further comprising the steps of:
  comparing the administrator password in the remote security software package to an administrator password stored in the non-volatile memory; and
  placing the non-volatile memory in an unlocked state if the administrator password of the remote security software package matches the administrator password in the non-volatile memory.

29. The method of claim 26, the target computer system including a secure memory device storing an administrator password and controlling the locking and unlocking of a non-volatile memory, the non-volatile memory storing security settings and being in a locked state, further comprising the step of:
  unlocking the non-volatile memory by the secure memory device if the administrator password of the remote security software package matches the administrator password stored in the secure memory device.

30. The method of claim 26, further comprising the step:
  encrypting th security settings of the remote security software package to be delivered to the target computer system.

31. The method of claim 26, further comprising the step of:
  remotely powering the target computer system before said step of delivering the remote security software package.

32. The method of claim 26, further comprising the step of:
  packaging software distribution application scripts in the remote security software package to be delivered to the target computer system.

33. The method of claim 26, wherein the configuration of a security setting is an inband process.

34. The method of claim 26, wherein the remote security code is an OCX file.

35. The method of claim 26, wherein the component object model-based remote security code is an ActiveX control.

36. The method of claim 26, wherein the remote security control container is an ActiveX control container.

37. The method of claim 26, further comprising the steps of:
  calling the remote security driver by the component object model-based remote security control code; and
  executing a remote configuration of a security setting by the remote security driver.

38. The method of claim 37, the target computer system having a remote security driver, further comprising the step of:
  dynamically loading the remote security driver to be called by the component object model-based remote security control code.

39. The method of claim 37, the remote security software package including encrypted security settings, further comprising the step of:
  decrypting the encrypted security settings after the step of delivering the remote security software package.

40. The method of claim 37, comprising the step of:
  disabling a power button of the target computer system before the step of executing a remote configuration of a security setting.

41. The method of claim 37, the target computer system having a software distribution application agent, tile remote security package including software distribution application scripts, further comprising the step of:
  invoking the step of executing a remote configuration of a security setting as a system process.

42. The method of claim 37, wherein the step of executing a remote configuration Cf a security setting comprises the step of activating a new configuration for the security setting.

43. The method of claim 37, the target computer system including a peripheral device having a locked state for preventing access to the peripheral device and an unlocked state for allowing access to the peripheral device, wherein the step of executing a remote configuration of a security setting comprises the step of dynamically switching the state of the peripheral device.

44. The method of claim 37, further comprising the step of:

remotely unpowering the target computer system after the step of executing a remote configuration of a security setting.

45. The method of claim 44, further comprising the step of:

enabling a power button of the target computer system after the step of executing a remote configuration of a security setting.

46. A computer system configured for remote non-volatile memory flashing and security management, comprising:

a system bus;

a processor coupled to the system bus;

a non-volatile memory coupled to the system bus, storing:
a remote flash and security package comprising:
a security settings file;
component object model-based remote flash and security control code for controlling remote flashing of the ROM and remote configuring of the security settings;
a non-volatile memory image file;
a file containing an administrator password, and
a remote flash and security control container for containing the component object model-based remote flash and security control code, the security settings file, the non-volatile memory image file, and the file containing the administrator password.

47. The computer system of claim 46, the remote flash and security package further comprising:

a remote flash and security driver for selectively executing a remote flash of the ROM and selectively executing a remote configuration of a security setting.

48. The computer system of claim 46, the non-volatile memory further storing:

a dynamically loadable remote flash and security driver for selectively executing a remote flash of the ROM and selectively executing a remote configuration of a security setting.

49. The computer system of claim 46, the remote flash and security package further comprising:

software distribution scripts for invoking execution of a remote flash of the non-volatile memory or execution of a remote configuration of a security setting as a system process.

50. The computer system of claim 46, the non-volatile memory image file comprising:

a checksum of the non-volatile memory image.

51. The computer system of 46, the remote flash and security package further comprising:

a file containing a pointer to the location of the non-volatile memory image file.

52. The computer system of claim 46, the non-volatile memory image file having a digital signature, the remote flash and security package further comprising:

a utility to verify the digital signature of the non-volatile memory image file.

53. The computer system of claim 46, wherein the non-volatile memory is a flash read-only-memory.

54. The computer system of claim 46, wherein the remote flash and security control is an OCX file.

55. The computer system of claim 46, wherein the component object model-based remote flash and security control code is an ActiveX control.

56. The computer system of claim 46, wherein the remote flash and security control container is an ActiveX control container.

57. The computer system of claim 46, wherein said non-volatile memory ROM image includes a digital signature.

58. The computer system of claim 46, wherein the security settings of the remote flash and security package are encrypted.

59. A computer system configured for non-volatile memory remote security management, comprising:

a system bus;

a processor coupled to the system bus; and a processor readable storage medium storing a remote security control package, the remote security control package comprising:
security settings;
component object model-based remote security control code for controlling a remote configuration of a security setting; and
a remote security control container for containing the component object model-based remote security control code and the security settings, the processor readable medium coupled to the system bus for directing the processor to perform the step of:
processing the remote security control package to execute a remote configuration of a security setting stored in the processor readable storage medium.

60. The computer system of claim 59, the remote security control package further comprising:

a remote security driver for selectively executing a remote configuration of a security setting.

61. The computer system of claim 59, wherein the processor readable storage medium further comprises:

a dynamically loadable remote security driver for selectively executing a remote configuration of a security setting.

62. The computer system of claim 59, the remote flash and security control package further comprising:

a file containing a uniform resource locator pointing to the non-volatile memory image.

63. The computer system of claim 59, the non-volatile memory image having a digital signature, the remote security control package further comprising:

a utility to verify the digital signature of the non-volatile memory image.

* * * * *

UNITED STATES PATENT AND TRADEMARK OFFICE
CERTIFICATE OF CORRECTION

PATENT NO.      : 6,223,284 B1
DATED           : April 24, 2001
INVENTOR(S)     : Manuel Novoa et al.

It is certified that error appears in the above-identified patent and that said Letters Patent is hereby corrected as shown below:

Column 5,
Line 9, delete "11)12" and insert -- IDE --.

Column 7,
Line 58, after "setting" delete "or" and insert -- for --.

Column 10,
Line 9, after "SYSTEM," delete "≅".
Line 21, after "is" delete ";".
Line 60, after "ing" delete ";".

Column 11,
Line 26, delete "Packets" and insert -- Packet --.

Column 12,
Line 16, delete "we" and insert -- the --.
Line 30, delete "Active XS" and insert -- ActiveX --.
Line 35, after "data" delete "an" and insert -- on --.
Line 67, delete "ill" and insert -- in --.

Column 13,
Line 19, delete "te" and insert -- the--.

Column 14,
Line 37, delete "DeviceIoControl" and insert -- DeviceIo-Control --.
Line 39, after "a" delete ",".
Line 43, delete "en" and insert -- an --.

Column 16,
Line 31, after "00000002h" delete ".".

Column 18,
Line 2, after "is" delete ".".
Line 20, delete "tile" and insert -- the --.
Line 65, delete "where" and insert -- when --.

Column 19,
Line 12, delete "te" and insert -- the --.

UNITED STATES PATENT AND TRADEMARK OFFICE
CERTIFICATE OF CORRECTION

PATENT NO.   : 6,223,284 B1
DATED        : April 24, 2001
INVENTOR(S)  : Manuel Novoa et al.

It is certified that error appears in the above-identified patent and that said Letters Patent is hereby corrected as shown below:

Column 20,
Line 40, delete "tile" and insert -- the --.

Column 21,
Line 9, delete "Mart" and insert -- than --.
Line 13, delete "support" and insert -- supports --.
Line 15, delete "bust" and insert -- trust --.
Line 24, delete "bout" and insert -- about --.

Column 22,
Line 12, delete "thf" and insert -- the --.
Line 24, after "CF" delete ".".
Line 50, after "A" delete ",".

Column 23,
Line 24, delete "811H" and insert -- 81H --.
Line 58, after "flashed" delete ",".

Column 24,
Line 66, after "preferably" delete ",".

Column 25,
Line 64, after "flash" delete "I)".

Column 26,
Line 4, after "block" delete ".".
Line 33, delete "tie" and insert -- the --.

UNITED STATES PATENT AND TRADEMARK OFFICE
CERTIFICATE OF CORRECTION

PATENT NO. : 6,223,284 B1
DATED : April 24, 2001
INVENTOR(S) : Manuel Novoa et al.

It is certified that error appears in the above-identified patent and that said Letters Patent is hereby corrected as shown below:

Column 30,
Line 59, delete "tile" and insert -- the --.
Line 65, delete "Cf" and insert -- of --.

Signed and Sealed this

Twenty-first Day of February, 2006

JON W. DUDAS
*Director of the United States Patent and Trademark Office*